(12) United States Patent
Kasaya et al.

(10) Patent No.: US 11,099,291 B2
(45) Date of Patent: Aug. 24, 2021

(54) SUBMARINE RESOURCE EXPLORATION SYSTEM, TRANSMISSION DEVICE, RECEPTION DEVICE, SIGNAL PROCESSING DEVICE, SIGNAL PROCESSING METHOD, ELECTRICAL EXPLORATION METHOD, ELECTROMAGNETIC EXPLORATION METHOD, AND PROGRAM

(71) Applicants: Japan Agency for Marine-Earth Science and Technology, Yokosuka (JP); Nippon Marine Enterprises, Ltd., Yokosuka (JP)

(72) Inventors: Takafumi Kasaya, Yokosuka (JP); Tadanori Goto, Yokosuka (JP); Yoshifumi Kawada, Yokosuka (JP); Hisanori Iwamoto, Yokosuka (JP)

(73) Assignee: Japan Agency for Marine-Earth Science and Technology & Nippon Marine Enterprises, Ltd., Yokosuka (JP)

( * ) Notice: Subject to any disclaimer, the term of this patent is extended or adjusted under 35 U.S.C. 154(b) by 79 days.

(21) Appl. No.: 16/312,210

(22) PCT Filed: Aug. 25, 2017

(86) PCT No.: PCT/JP2017/030527
§ 371 (c)(1),
(2) Date: Dec. 20, 2018

(87) PCT Pub. No.: WO2018/047638
PCT Pub. Date: Mar. 15, 2018

(65) Prior Publication Data
US 2019/0204465 A1 Jul. 4, 2019

(30) Foreign Application Priority Data

Sep. 9, 2016 (JP) .............................. JP2016-176889

(51) Int. Cl.
*G01V 3/165* (2006.01)
*G01V 3/08* (2006.01)
*G01V 3/10* (2006.01)

(52) U.S. Cl.
CPC ................ *G01V 3/165* (2013.01); *G01V 3/08* (2013.01); *G01V 3/10* (2013.01); *Y02A 90/30* (2018.01)

(58) Field of Classification Search
CPC ............. G01V 3/165; G01V 3/08; G01V 3/10
See application file for complete search history.

(56) References Cited

U.S. PATENT DOCUMENTS

| 4,298,840 | A | 11/1981 | Bischoff et al. |
| 5,206,640 | A * | 4/1993 | Hirvonen ................. G01V 3/02 340/852 |

(Continued)

FOREIGN PATENT DOCUMENTS

| CN | 101116010 A | 1/2008 |
| CN | 204269841 U | 4/2015 |

(Continued)

OTHER PUBLICATIONS

Extended European Search Report, App. No. EP17848579.3, dated Mar. 30, 2020, 11 Pages.

(Continued)

*Primary Examiner* — Reena Aurora
(74) *Attorney, Agent, or Firm* — Berkeley Law & Technology Group, LLP

(57) ABSTRACT

A transmission device of a submarine resource exploration system includes a transmission unit which transmits a predetermined transmission artificial signal transmitted in order to perform exploration of submarine resources in water using water as a medium. A reception device includes a reception unit which receives a composite signal of a (Continued)

received artificial signal representing a signal propagated to the reception device using water as a medium in the transmission artificial signal, and a self-potential propagated to the reception device using water as a medium due to a potential anomaly generated due to submarine resources. A signal processing device includes a signal processing unit which separates the composite signal into the received artificial signal and the self-potential.

14 Claims, 14 Drawing Sheets

(56) References Cited

U.S. PATENT DOCUMENTS

| | | | | |
|---|---|---|---|---|
| 6,236,211 | B1* | 5/2001 | Wynn | G01V 3/02 |
| | | | | 324/357 |
| 10,613,246 | B2* | 4/2020 | Mattsson | G01V 3/15 |
| 2011/0227579 | A1 | 9/2011 | Morrison et al. | |
| 2012/0134671 | A1 | 5/2012 | Edwards et al. | |
| 2013/0229184 | A1 | 9/2013 | Skogman et al. | |
| 2014/0035759 | A1* | 2/2014 | Ramsfjell | G01V 3/12 |
| | | | | 340/850 |
| 2015/0123835 | A1 | 5/2015 | Sokolowsky et al. | |

FOREIGN PATENT DOCUMENTS

| | | |
|---|---|---|
| JP | 60135783 A | 7/1985 |
| JP | 03104844 | 12/2003 |
| JP | 2005530135 A | 10/2005 |
| JP | 2006145360 A | 6/2006 |
| JP | 2009110262 A | 5/2009 |
| WO | 03104844 A1 | 12/2003 |

OTHER PUBLICATIONS

Notice of Reasons for Rejection, App. No. JP2018-538353, dated Nov. 27, 2019, dated Dec. 3, 2019, 10 Pages.

Heinson, et al, "Marine self-potential gradiant exploration of the continental margin," Geophysics, vol. 70, No. 5, G109-G118, Sep.-Oct. 2005, 12 Pages.

Ueda, et al, "Sub-seafloor resistivity sensing using a vertical electrode configuration," Earth, Planets and Space, http://www.earth-planets-space.com/content/66/1/31, doi: 10.1186/1880-5981-66-31, 2014, 8 Pages.

Goto, et al, "A marine deep-towed DC resistivity survey in a methane hydrate area, Japan Sea," Exploration Geophysics vol. 39, 2008, pp. 52-59.

McKay, et al, "Towed Streamer EM-reliable recovery of sub-surface resistivity," First Break vol. 33, Apr. 2015, pp. 75-85.

Sato, et al, "The Electrochemical Mechanism of Sulfide Self-Potentials," Geophysics vol. 25, No. 1, Feb. 1960, pp. 226-249.

International Search Report, App. No. PCT/JP2017/030527, dated Nov. 21, 2017, 4 Pages.

Notice of Allowance, App. No. JP2018-538353, dated Oct. 12, 2020, 7 Pages.

Office Action, App. No. CN201780035511.9, dated Aug. 17, 2020, 19 Pages.

* cited by examiner and claims priority to Japanese Patent Application No. 2016-176889, filed on Sep. 9, 2016, and entire contents of all of the aforementioned applications are incorporated herein by reference.

SUBMARINE RESOURCE EXPLORATION SYSTEM, TRANSMISSION DEVICE, RECEPTION DEVICE, SIGNAL PROCESSING DEVICE, SIGNAL PROCESSING METHOD, ELECTRICAL EXPLORATION METHOD, ELECTROMAGNETIC EXPLORATION METHOD, AND PROGRAM

CROSS REFERENCE TO RELATED APPLICATION

This is a Continuation Application of International Application No. PCT/JP2017/030527, filed on Aug. 25, 2017, which claims priority to Japanese Patent Application No. 2016-176889, filed on Sep. 9, 2016, and entire contents of all of the aforementioned applications are incorporated herein by reference.

FIELD

The present invention relates to a submarine resource exploration system, a transmission device, a reception device, a signal processing device, a signal processing method, an electrical exploration method, an electromagnetic exploration method, and a program

BACKGROUND

Conventionally, a technology for measuring self-potentials generated due to submarine resources and exploring for submarine resources on the basis of measured self-potentials has been proposed (refer to Non-Patent Literature 1, for example).

However, more efficient exploration with higher accuracy than conventional technologies is required in submarine resource exploration. To perform efficient and high-accuracy submarine resource exploration, it is necessary to perform simultaneous explorations based on a plurality of exploration principles, to improve the accuracy of each exploration and to process signals in parallel. Accordingly, as a method for simultaneously performing a plurality of explorations, a technology capable of correctly separating a composite signal which is a time-series signal observed as a mixture of a received artificial signal generated due to a transmission artificial signal having an amplitude and frequency components having been controlled, which is transmitted in order to perform submarine resource exploration, and self-potentials associated with potential anomalies caused by submarine resources into a received artificial signal and a self-potential is required in order to process signals in parallel when self-potential exploration and exploration using an artificial current source are performed.

Accordingly, an object of the present invention is to provide a submarine resource exploration system, a transmission device, a reception device, a signal processing device, a signal processing method, an electrical exploration method, an electromagnetic exploration method and a program capable of solving the aforementioned problem.

BRIEF DESCRIPTIONS OF THE DRAWINGS

DETAILED DESCRIPTION

First Embodiment

Hereinafter, a first embodiment of the present invention will be described with reference to the drawings.

First, a configuration of a submarine resource exploration system according to the first embodiment of the present invention will be described with reference to FIGS. 1 to 5. Further, it is assumed that various noises are sufficiently insignificant compared to a received artificial signal, a self-potential, a composite signal, and a transmission artificial signal which will be described later in the first embodiment of the present invention. The received artificial signal is a signal propagated using water, submarine resources, other objects and the like as a medium, in the transmission artificial signal intentionally transmitted from a transmission device in order to perform electrical exploration or electromagnetic exploration, and arriving at a reception device. In addition, the self-potential is a signal generated from submarine resources such as ores and gas hydrate, propagated using water, submarine resources, other objects and the like as a medium and arriving at a reception device. A self-potential normally represents a low frequency component (which depends on a measurement altitude but has a period of more than several seconds, for example). The composite signal is a signal in which a received artificial signal and a self-potential have been mixed and received by a reception device.

Figure 1:
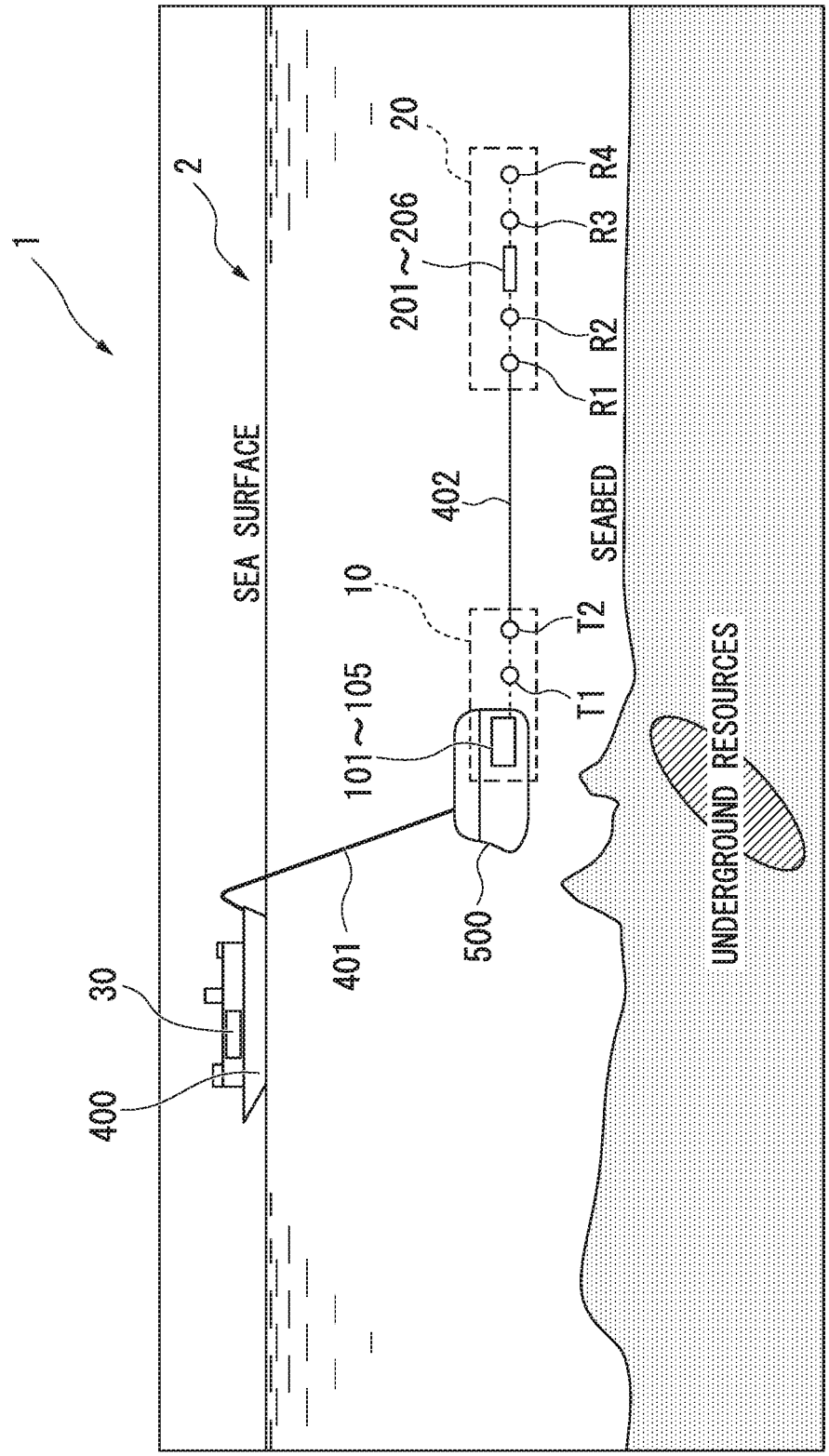
FIG. 1 is a diagram representing a submarine resource exploration system according to a first embodiment of the present invention.

FIG. 1 is a diagram showing a submarine resource exploration system 1 according to the first embodiment of the present invention.

As shown in FIG. 1, the submarine resource exploration system 1 includes a signal processing system 2, a vessel 400 and a moving body 500.

The submarine resource exploration system 1 allows submarine resource exploration in a deep sea area deeper than 1000 m. The moving body 500, transmission electrodes T1 and T2 and potential measurement electrodes R1, R2, R3 and R4 which will be described later are moved (or autonomously move) in sea (an example of underwater) having a water depth of about tens of m from the seafloor, for example.

The signal processing system 2 includes a transmission device 10, a reception device 20 and a signal processing device 30.

Figure 2:
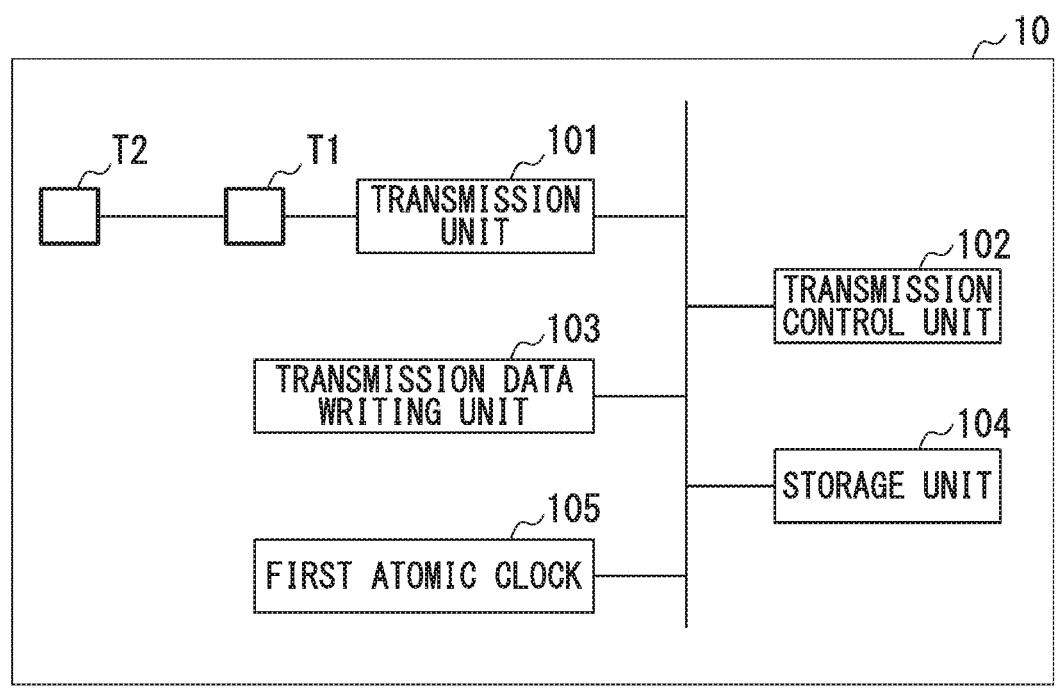
FIG. 2 is a diagram representing a configuration of a transmission device according to the first embodiment of the present invention.

FIG. 2 is a diagram showing a configuration of the transmission device 10 according to the first embodiment of the present invention.

As shown in FIG. 2, the transmission device 10 includes a transmission unit 101, a transmission control unit 102, a transmission data writing unit 103, a storage unit 104, a first atomic clock 105, and transmission electrodes T1 and T2.

For example, the transmission device 10 may be provided in the moving body 500.

The transmission unit 101 transmits a current signal continuously representing a transmission artificial signal from each of the transmission electrodes T1 and T2 to the reception device 20 in the sea on the basis of control of the transmission control unit 102.

Figure 3:
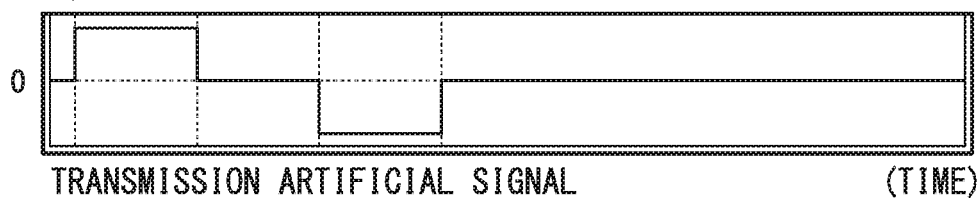
FIG. 3 is a diagram representing a transmission artificial signal in the first embodiment of the present invention.

The transmission artificial signal is a signal having an amplitude and frequency components controlled in advance and is intentionally transmitted from the transmission device in order to perform electrical exploration or electromagnetic exploration and represents a current artificially generated in order to calculate a resistivity p and a chargeability M at each position of the moving body 500 which moves in the sea during exploration. For example, the transmission artificial signal may be a signal having an amplitude and frequency components controlled in advance, such as a pulse signal as shown in FIG. 3 and a sinusoidal signal, and representing a higher frequency than frequency components represented by self-potentials. Further, when the transmission artificial signal is generated using a linear amplifier, an insulated gate bipolar transistor (IGBT), a metal oxide semiconductor field effect transistor (MOSFET), a silicon carbide (SiC) or the like, the transmission artificial signal has fewer unnecessary frequency components and is close to a desired waveform, compared to cases in which the transmission artificial signal is generated using a transformer or the like.

The transmission electrodes T1 and T2 are provided at different positions in a predetermined positional relationship. For example, the transmission electrodes T1 and T2 may be connected in order through an electrode rod which is a rod-shaped member formed of fiber reinforced plastics (FRP), a thermoplastic resin (e.g., polypropylene (PP)) or the like. The interval between the transmission electrodes T1 and T2 is 20 m, for example. The interval between the transmission electrodes T1 and T2 may be changed according to a depth from the seafloor at which submarine resource exploration is performed.

A case in which the submarine resource exploration system 1 according to the first embodiment of the present invention includes the two transmission electrodes T1 and T2 is represented as an example. Further, the number of transmission electrodes may be three or more in the submarine resource exploration system 1 according to the first embodiment of the present invention, and the accuracy of exploration performed by the submarine resource exploration system 1 improves as the number of transmission electrodes increases.

The transmission control unit 102 controls the transmission unit 101 such that the transmission artificial signal is transmitted to the reception device 20.

The transmission data writing unit 103 associates the transmission artificial signal transmitted by the transmission control unit 102 to the reception device 20 with a time indicated by the first atomic clock 105 and a position of the transmission device 10 when the transmission control unit 102 has transmitted the transmission artificial signal at predetermined intervals (e.g., a sampling rate of about 20 to 50 Hz) and writes the transmission artificial signal associated with the time and the position in the storage unit 104.

The storage unit 104 stores various types of information necessary for processes performed by the transmission device 10. For example, the storage unit 104 may store a data table TBL1 (first data table) in which the transmission artificial signal transmitted by the transmission control unit 102 to the reception device 20 is associated with the time indicated by the first atomic clock 105.

The first atomic clock 105 has a standard of a higher-accuracy frequency than a quartz resonator and generates an accurate clock signal and an absolute time which is correct all the time.

Figure 4:
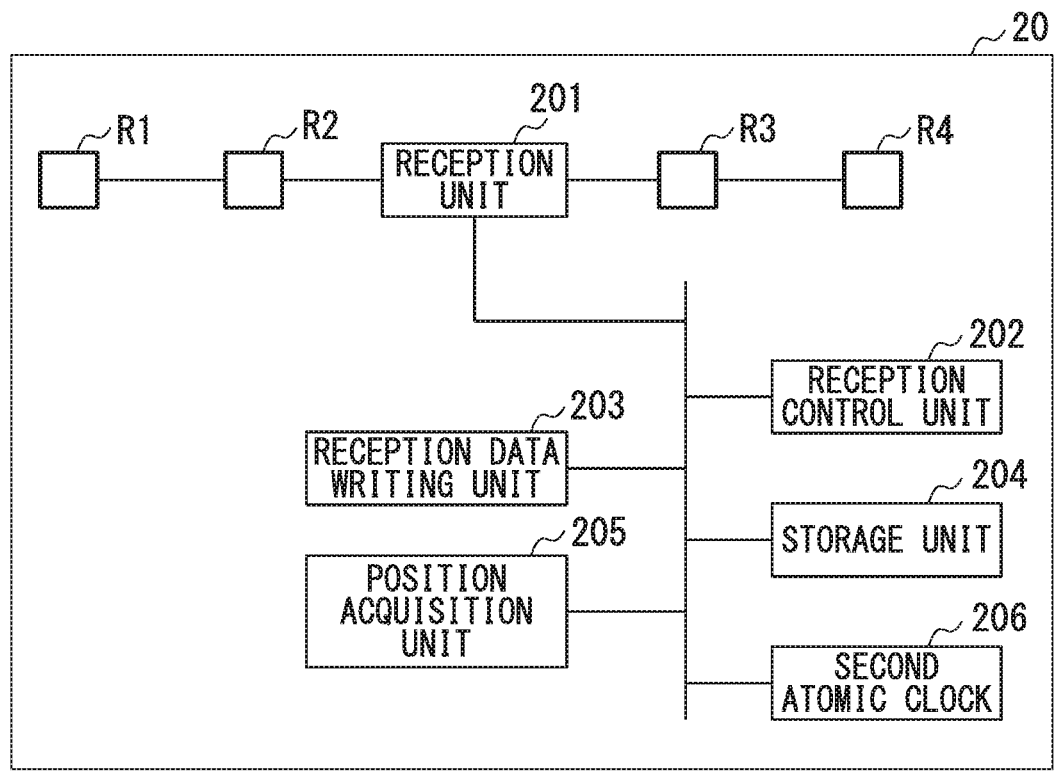
FIG. 4 is a diagram representing a configuration of a reception device according to the first embodiment of the present invention.

FIG. 4 is a diagram representing a configuration of the reception device 20 according to the first embodiment of the present invention.

As shown in FIG. 4, the reception device 20 includes a reception unit 201, a reception control unit 202, a reception data writing unit 203, a storage unit 204, a position acquisition unit 205, a second atomic clock 206 and potential measurement electrodes R1, R2, R3 and R4. The reception device 20 is connected to the moving body 500 through a cable 402. Accordingly, the reception device 20 moves in the sea according to movement of the moving body 500 (accordingly, according to navigation of the vessel 400).

The reception unit 201 continuously receives composite signals through the potential measurement electrodes R1, R2, R3 and R4 on the basis of control of the reception control unit 202. Specifically, the reception unit 201 measures composite signals of the potential measurement electrodes R1, R2, R3 and R4 using a common electrode as a standard. Since the moving body 500, the transmission electrodes T1 and T2, and the potential measurement electrodes R1, R2, R3 and R4 move in water, as described above, composites signals of the potential measurement electrodes R1, R2, R3 and R4 at a plurality of positions in water are measured according to continuous measurement.

As a electrometer included in the reception unit 201, a conventional electrometer may be used. Further, the function of the electrometer included in the reception unit 201 may be installed in the moving body 500 like a conventional electrometer. Further, there are n×(n−1)/2 combinations of potential measurement electrodes, and the number of intervals between potential measurement electrodes increases when the number n of potential measurement electrodes increases and thus a total number of voltages between potential measurement electrodes, which can be calculated from composite signals, increases. As a result, the number of pieces of data used for underground resource exploration performed by the submarine resource exploration system 1 increases and the accuracy of exploration results produced by the submarine resource exploration system 1 is improved.

Generally, self-potentials are signals representing voltages generated due to submarine resources such as ores and gas hydrate under the seafloor present at positions relatively distant from the potential measurement electrodes R1, R2, R3 and R4.

The potential measurement electrodes R1, R2, R3 and R4 are provided at different positions in a predetermined positional relationship. For example, the potential measurement electrodes R1, R2, R3 and R4 may be connected in order through an electrode rod which is a rod-shaped member formed of fiber reinforced plastics (FRP), a thermoplastic resin (e.g., polypropylene (PP)) or the like. The interval between the potential measurement electrodes R1, R2, R3 and R4 is about 5 to 15 m, for example. In addition, the interval between the moving body 500 and the potential measurement electrode R1 closest to the moving body 500 may be about 50 to 200 m, for example. Further, a common electrode which is not shown may be provided between the potential measurement electrodes R1 and R2, for example. A conventional non-polarized electrode used for potential measurement in the sea is used as each of the potential measurement electrodes R1, R2, R3 and R4.

The reception control unit 202 controls the reception unit 201 such that the reception unit 201 samples a composite signal received by the reception unit 201 at predetermined time intervals (e.g., the same time interval as the predetermined time interval at which a transmission artificial signal transmitted by the transmission control unit 102 to the reception device 20 is associated with a time indicated by the first atomic clock 105).

The reception data writing unit 203 associates the value of the composite signal sampled by the reception unit 201 with a time indicated by the second atomic clock 206 when the reception unit 201 has performed the sampling and a position of the reception device 20 when the reception unit 201 has performed the sampling and writes the value associated with the time and the position in the storage unit 204.

The storage unit 204 stores various types of information necessary for processes performed by the reception device 20. For example, the storage unit 204 may store a data table TBL2 (second data table) in which the composite signal sampled by the reception unit 201 is associated with the time when the reception unit 201 has sampled the composite signal and the position of the reception device 20 when the reception unit 201 has sampled the composite signal.

The position acquisition unit 205 of the reception device 20 continuously acquires absolute positions of the reception device 20. For example, the position acquisition unit 205 may be a conventional submarine positioning device and continuously acquires information of a latitude, a longitude and a depth at predetermined time intervals. Further, the position acquisition unit 205 is not necessarily included in the reception device 20 and may be connected to any location on the reception device 20 as a rod-shaped member like the potential measurement electrodes R1, R2, R3 and R4, for example. That is, the position acquisition unit 205 may be included anywhere as long as it can identify the position of the reception device 20 as an absolute position. The moving body 500 continuously acquires absolute positions according to positioning from the vessel, inertial navigation or the like and records the absolute positions as position information of the transmission unit 10 to specify a positional relationship between the transmission device 10 and the position acquisition unit 20 along with position information recorded in the position acquisition unit 205. Further, regarding the positional relationship between the transmission device 10 and the reception device 20, a relative position may be acquired by performing positioning between the transmission device 10 and the reception device 20.

The second atomic clock 206 has the same standard of a high-accuracy frequency as the standard of frequency in the first atomic clock 105 and generates an accurate clock signal. In addition, the second atomic clock 206 generates the same absolute time as the absolute time of the first atomic clock 105 by the time thereof being set using the time of the first atomic clock 105.

Figure 5:
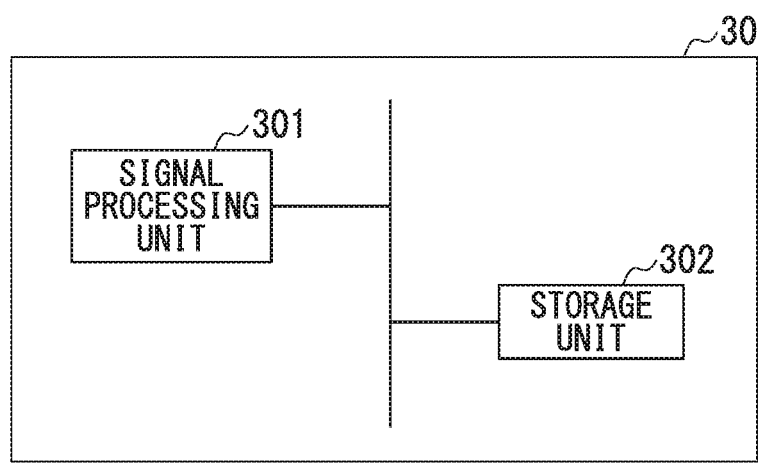
FIG. 5 is a diagram representing a configuration of a signal processing device according to the first embodiment of the present invention.

FIG. 5 is a diagram representing a configuration of the signal processing device 30 according to the first embodiment of the present invention.

The signal processing device 30 includes a signal processing unit 301 and a storage unit 302, as shown in FIG. 5.

The signal processing unit 301 acquires information represented by the data table TBL2 stored in the storage unit 204 from the reception device 20. Specifically, after the moving body 500 moves in an investigation area, a person in charge who pulls up the storage unit 204 from the sea and performs analysis moves the information represented by the data table TBL2 from the storage unit 204 to the storage unit 302 through a storage medium such as a USB memory, for example.

The signal processing unit 301 reads the information represented by the data table TBL2 from the storage unit 302.

Figure 6:
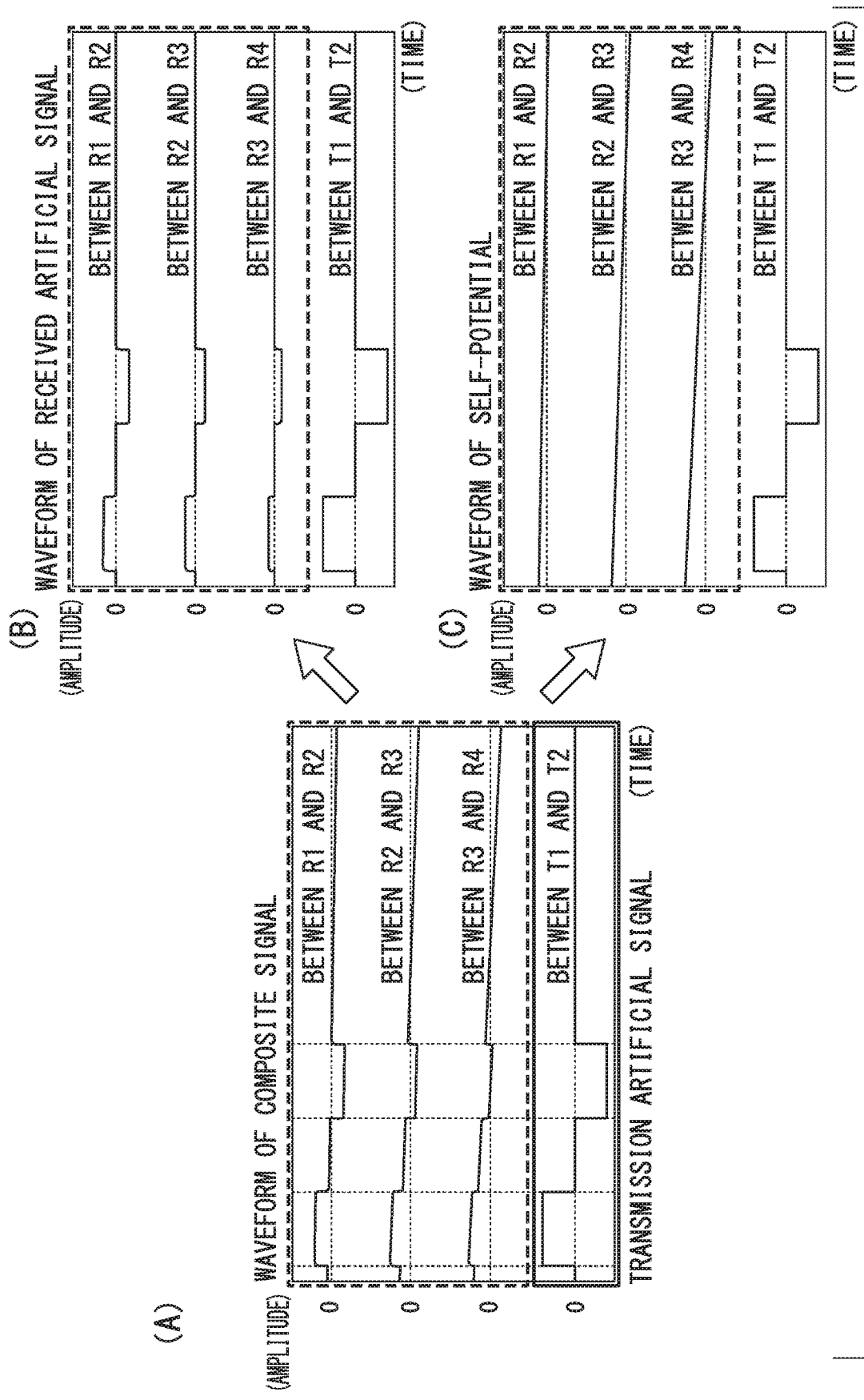
FIG. 6 is a first diagram for describing separation of a composite signal in the first embodiment of the present invention.

The signal processing unit 301 separates an identified composite signal into a received artificial signal and a self-potential, as shown in FIG. 6.

For example, the signal processing unit 301 may remove a received artificial signal which is a high-frequency component from the composite signal and extracts a self-potential by passing the composite signal through a low pass filter having a cutoff frequency determined on the basis of the waveform of the identified composite signal (e.g., the waveform of the composite signal shown in part (A) of FIG. 6). The signal processing unit 301 calculates the received artificial signal by subtracting the extracted self-potential from the composite signal.

In this manner, the signal processing unit 301 is able to separate the composite signal show in part (A) of FIG. 6 into the received artificial signal shown in part (B) of FIG. 6 and the self-potential shown in part (C) of FIG. 6.

In addition, it is determined whether the self-potential represents as a linear function or a higher-order function on the basis of the waveform of the identified composite signal, for example, and the signal processing unit 301 calculates an approximation of the linear function or the higher-order function which represents the self-potential. The signal processing unit 301 calculates the received artificial signal by subtracting the self-potential represented by the calculated approximation of the linear function or the higher-order function from the composite signal.

In this manner, the signal processing unit 301 may separate the composite signal represented in part (A) of FIG. 6 into the received artificial signal represented in part (B) of FIG. 6 and the self-potential represented in part (C) of FIG. 6.

Further, the signal processing unit 301 according to the present embodiment separates the composite signal into the received artificial signal and the self-potential by performing principal component analysis (PCA) or independent component analysis (ICA) as in the process in which the noise removal unit removes noise included in measured potentials by performing principal component analysis (PCA) or independent component analysis (ICA) using potentials of a plurality of potential electrodes represented by potential information acquired by an estimation information acquisition unit, disclosed in paragraph [0040] of Patent Application No. 2016-020642, for example. Specifically, the signal processing unit 301 performs principal component analysis (PCA) or independent component analysis (ICA) using potentials of a plurality of potential electrodes represented by potential information acquired by the potential measurement electrodes R1, R2, R3 and R4. Principal component analysis or independent component analysis can separate a signal into predetermined separated components (a received artificial signal component and a self-potential component in this case) according to statistical processing and can be applied when the composite signal is separated into the received artificial signal and the self-potential. More specifically, the signal processing unit 301 performs extraction of a self-potential component or removal of a received artificial signal component from each separated component obtained by performing principal component analysis or independent component analysis and reconstitutes values of separated components to calculate a self-potential component from which a received artificial signal component has been removed on the basis of a contribution ratio or a component load amount (principle component load amount or independent component load amount) of each separated component (self-potential component and received artificial signal component) obtained according to principle component analysis or independent component analysis. The signal processing unit 301 calculates a self-potential from the self-potential component. In addition, the signal processing unit 301 performs extraction of a received artificial signal component or removal of a self-potential component from separated components obtained by performing principal component analysis or independent component analysis and reconstitutes values of the separated components to calculate a potential, that is, a received artificial signal component, from which the self-potential component has been removed on the basis of a contribution ratio or a component load amount (principle component load amount or independent component load amount) of each separated component (self-potential component and received artificial signal component) obtained according to principle component analysis or independent component analysis. The signal processing unit 301 calculates a received artificial signal from the received artificial signal component.

In this manner, the signal processing unit 301 may perform principle component analysis or independent component analysis to separate the composite signal represented in part (A) of FIG. 6 into the received artificial signal represented in part (B) of FIG. 6 and the self-potential represented in part (C) of FIG. 6.

Figure 7:
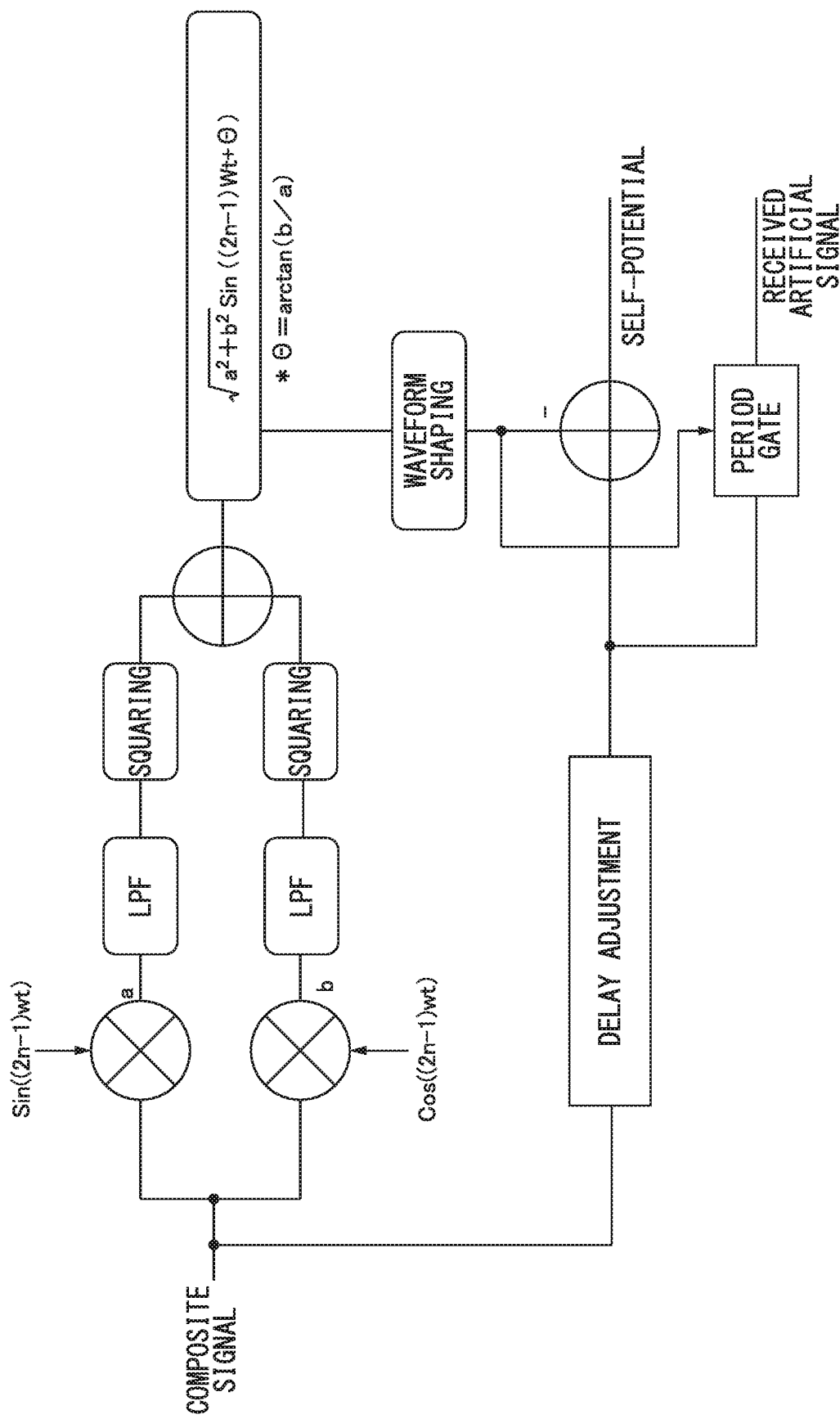
FIG. 7 is a second diagram for describing separation of a composite signal in the first embodiment of the present invention.

In addition, the signal processing unit 301 separates a composite signal into a received artificial signal and a self-potential using a correlation between a transmission artificial signal having an amplitude and frequency components controlled in advance and a signal correlated with the transmission artificial signal, for example. Specifically, the signal processing unit 301 multiplies a received composite signal by a sine wave of each frequency component included in the transmitted transmission artificial signal and a cosine wave having a phase 90° different from the sine wave, as shown in FIG. 7. For example, when the transmission artificial signal is a rectangular wave, if n=1, 2, . . . , the transmission artificial signal may include high-frequency components of odd-number multiples of a fundamental wave. Accordingly, the composite signal is multiplied by a sine wave and a cosine wave representing high-frequency components of a case of odd-number of the fundamental wave included in the transmission artificial signal. When a signal amplitude when the composite signal is multiplied by the sine wave is a, a signal amplitude when the composite signal is multiplied by the cosine wave is b, signals obtained by passing the respective signals through a low pass filter (LPF), for example, and squaring the resultant signals are added, each frequency component f included in a received artificial signal in the composite signal may be obtained as represented by the following equation (1).

[Equation. 1]

$$f=\sqrt{a^2+b^2}\sin[(2n-1)\omega t+\theta] \quad (1)$$

Meanwhile, θ denotes a phase represented by the following equation (2).

[Equation. 2]

$$\theta=\arctan(b/a) \quad (2)$$

The signal processing unit 301 identifies a period corresponding to respective times from a maximum value of the amplitude and combines each frequency component f in each period to identify a received artificial signal in a composite signal received in each period.

In addition, the signal processing unit 301 adjusts a delay of a composite signal received when phase θ=0 from a period and phase θ corresponding to respective times from the maximum value of the amplitude.

The signal processing unit 301 subtracts, from the delay-adjusted composite signal, a received artificial signal identified in the composite signal. Accordingly, it is possible to identify a self-potential in each identified period.

In this manner, the signal processing unit 301 is able to separate the composite signal represented in part (A) of FIG. 6 into the received artificial signal represented in part (B) of FIG. 6 and the self-potential represented in part (C) of FIG. 6.

Further, the signal processing unit 301 removes a self-potential which is a low-frequency component from a composite signal and extracts a received artificial signal by passing the composite signal through a high pass filter having a cutoff frequency determined on the basis of the waveform of the identified composite signal (e.g., the waveform of the composite signal shown in part (A) of FIG. 6), for example. The signal processing unit 301 may calculate the self-potential by subtracting the extracted received artificial signal from the composite signal.

In this manner, the signal processing unit 301 is able to separate the composite signal represented in part (A) of FIG. 6 into the received artificial signal represented in part (B) of FIG. 6 and the self-potential represented in part (C) of FIG. 6.

Further, the signal processing unit 301 divides the waveform of an identified composite signal into a plurality of periods and determines whether to use the aforementioned low pass filter, to use an approximation of a linear function, to use an approximation of a higher-order function, to use principle component analysis or independent component analysis, to use a correlation between a transmission artificial signal having an amplitude and a signal waveform controlled in advance and a signal correlated with the transmission artificial signal or to use a high pass filter for each period after division, for example. The signal processing unit 301 may separate a composite signal into a self-potential and a received artificial signal using a determined method for each divided period.

The signal processing unit 301 associates each of the separated received artificial signal and self-potential with a time corresponding thereto and positions of the reception device 20 and the moving body 500 and writes the associated signal, time and positions in the storage unit 302.

The vessel 400 sails on the sea. The moving body 500 moves in the sea according to navigation of the vessel 400.

The moving body 500 is connected to the vessel 400 through a cable 401. For example, the moving body 500 may be an underwater vehicle such as an autonomous underwater vehicle (AUV) or a remotely operated vehicle (ROV) which autonomously navigates in the sea.

Each of the moving body 500, the transmission electrodes T1 and T2 and the potential measurement electrodes R1, R2, R3 and R4 may be moved while maintaining a certain degree of altitude from the seabed. In addition, each of the moving body 500, the transmission electrodes T1 and T2 and the potential measurement electrodes R1, R2, R3 and R4 may be substantially moved at a certain depth of water (maintaining a certain degree of distance from the sea surface).

Figure 8:
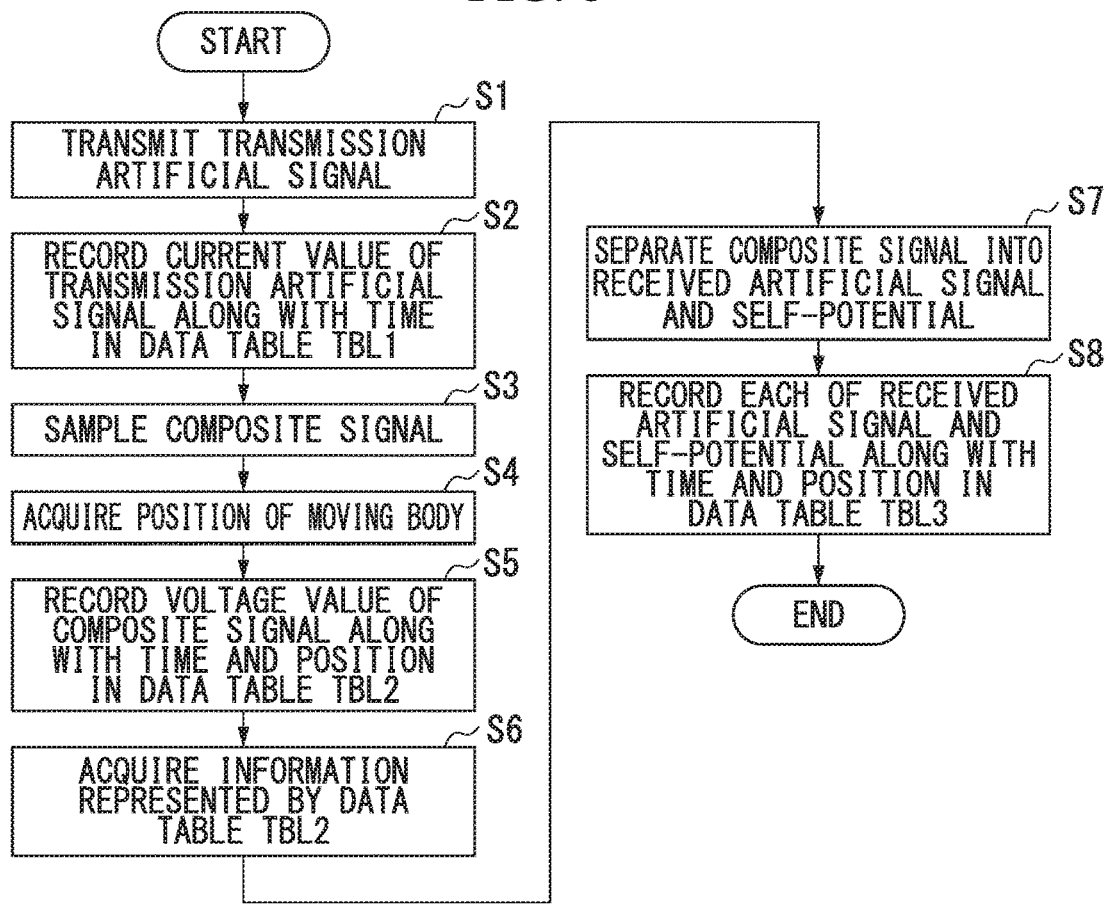
FIG. 8 is a diagram representing a process flow of the submarine resource exploration system according to the first embodiment of the present invention.

FIG. 8 is a diagram representing a process flow of the submarine resource exploration system 1 according to the first embodiment of the present invention.

Next, processes of the submarine resource exploration system 1 will be described.

The vessel 400 navigates on the sea. The moving body 500 moves in the sea according to navigation of the vessel 400.

The transmission unit 101 continuously outputs a current signal representing a transmission artificial signal from the transmission electrode T1 to the transmission electrode T2 in the sea on the basis of control of the transmission control unit 102 (step S1).

The transmission data writing unit 103 associates the current value of the transmission artificial signal transmitted by the transmission control unit 102 to the reception device 20 with a time indicated by the first atomic clock 105 and writes the current value associated with the time to the data table TBL1 of the storage unit 104 at predetermined time intervals (e.g., a sampling rate of about 20 to 50 Hz) generated on the basis of a clock signal generated from the first atomic clock 105 (step S2).

The reception unit 201 continuously samples a composite signal at predetermined time intervals generated on the basis of a clock signal generated from the second atomic clock 206 through the potential measurement electrodes R1, R2, R3 and R4 on the basis of control of the reception control unit 202 (step S3).

The position acquisition unit 205 continuously acquires positions of the reception device 20 in parallel with continuous sampling of the composite signal performed by the reception unit 201 (step S4).

The reception data writing unit 203 acquires a time when the reception unit 201 has sampled the composite signal from the second atomic clock 206.

The reception data writing unit 203 acquires a position of the reception device 20 when the reception unit 201 has sampled the composite signal from the position acquisition unit 205.

The reception data writing unit 203 associates the voltage value of the composite signal sampled by the reception unit 201, the time acquired from the second atomic clock 206 and the position of the reception device 20 acquired from the position acquisition unit 205 and writes the associated voltage value, time and position to the data table TBL2 of the storage unit 204 (step S5).

The signal processing unit 301 acquires information represented by the data table TBL2 stored in the storage unit 204 from the reception device 20 (step S6). Specifically, after the moving body 500 moves in an investigation area, a person in charge who pulls up the storage unit 204 from the sea and performs analysis moves the information representing by the data table TBL2 from the storage unit 204 to the storage unit 302 through a storage medium such as a USB memory. The signal processing unit 301 reads the information represented by the data table TBL2 from the storage unit 302.

The signal processing unit 301 separates the composite signal in the data table TBL2 into a received artificial signal and a self-potential (step S7).

The signal processing unit 301 associates each of the separated received artificial signal and self-potential with a time corresponding thereto and the positions of the reception device 20 and the moving body 500 and writes the associated signal, time and positions to a data table TBL3 of the storage unit 302 (step S8).

As described above, the submarine resource exploration system 1 is able to separate a composite signal at respective times or positions of each of the reception device 20 and the moving body 500 into a received artificial signal and a self-potential.

Accordingly, the submarine resource exploration system 1 is able to obtain a received artificial signal which is parameters of a resistivity $\rho$ and a chargeability M according to geophysical exploration through electrical exploration and electromagnetic exploration in addition to a self-potential which is a parameter obtained through a self-potential method used for exploration of submarine resources (ores, gas hydrate and the like). The accuracy of submarine resource exploration is improved by using the resistivity $\rho$ and the chargeability M.

Further, the signal processing unit 301 may calculate an electric field V/m by dividing a self-potential V by distances between the common electrode and the potential measurement electrodes R1, R2, R3 and R4 and generate electric field data at each position of the moving body 500. The distances between the common electrode and the potential measurement electrodes R1, R2, R3 and R4 are predetermined, and the storage unit 302 stores the distances with respect to the potential measurement electrodes R1, R2, R3 and R4. The signal processing unit 301 may read the distances with respect to the potential measurement electrodes R1, R2, R3 and R4 from the storage unit 302.

In addition, the signal processing unit 301 may calculate a resistivity $\rho$ of submarine resources on the basis of a current output by the transmission unit 101 and a self-potential and a received artificial signal separated from a composite signal measured by the reception unit 201 through each of the potential measurement electrodes R1, R2, R3 and R4.

Figure 9:
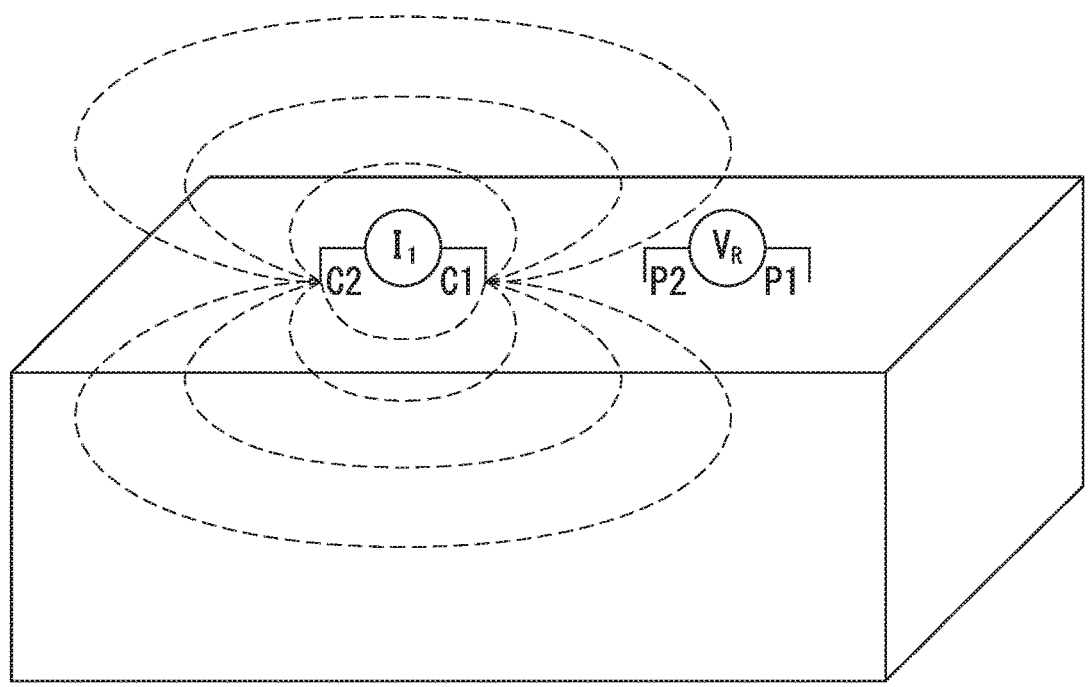
FIG. 9 is a first diagram for describing a dipole-dipole method in the first embodiment of the present invention.

FIG. 9 is a first diagram for describing a dipole-dipole method in the first embodiment of the present invention.

Figure 10:
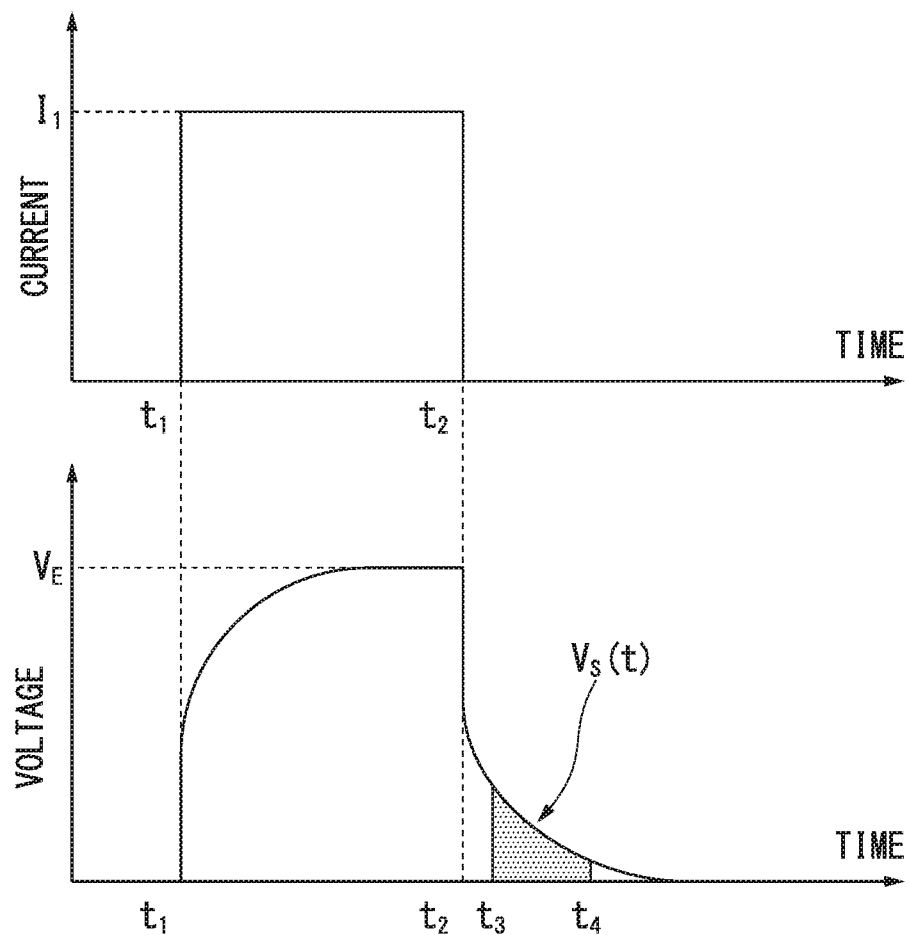
FIG. 10 is a second diagram for describing a dipole-dipole method in the first embodiment of the present invention.

FIG. 10 is a second diagram for describing the dipole-dipole method in the first embodiment of the present invention.

For example, "dipole-dipole method" may be used in electrical submarine resource exploration as disclosed in non-Patent Literature T. Goto et al., "A marine deep-towed DC resistivity survey in a methane hydrate area, Japan Sea", Exploration Geophysics, 2008, 39, 52-59; Butsuri-Tansa, 2008, 61, 52-59; Mulli-Tamsa, 2008, 11, 52-59. As a very simple aspect of the "dipole-dipole method," a pair of transmission electrodes and a pair of reception electrodes are separately disposed, as shown in FIG. 9. A potential measurement electrode far from current measurement electrodes C1 and C2 is set to P1 and a potential measurement electrode close to the current measurement electrodes C1 and C2 is set to P2, as shown in FIG. 9. In addition, a current measurement electrode close to the potential measurement electrodes P1 and P2 is set to C1 and a current measurement electrode far from the potential measurement electrodes P1 and P2 is set to C2, as shown in FIG. 9. When the "dipole-dipole method" is applied to the submarine resource exploration system shown in FIG. 1, a resistivity ρ of a submarine resource may be calculated as represented by the following expression (3).

[Equation 3]

$$\rho = 4\pi \frac{V_R}{I_1} \left( \frac{1}{r_1} - \frac{1}{r_2} - \frac{1}{r_3} + \frac{1}{r_4} \right)^{-1} \quad (3)$$

Here r1 is a distance between the potential measurement electrode P1 and a current measurement electrode Ci. Further, the distance between electrodes r1 is a distance between the potential measurement electrode P1 and the current measurement electrode Ci. The current measurement electrode Ci=C1, C2, and two current measurement electrodes may be selected. A distance between electrodes r2 is a distance between the potential measurement electrode P1 and a common electrode COM. A distance between electrodes r3 is a distance between the potential measurement electrode P2 and the current measurement electrode Ci. A distance between electrodes r4 is a distance between the potential measurement electrode P2 and the common electrode COM.

A current $I_1$ is a current flowing between the current measurement electrodes C1 and C2 and a stabilized current shown in FIG. 10. A voltage $V_R$ is a potential difference between the potential measurement electrodes P1 and P2 and a stabilized primary potential.

In addition, the signal processing unit 301 may calculate a resistivity ρ of submarine resources on the basis of a potential contributing to a received artificial signal and a self-potential and a received artificial signal separated from a composite signal measured by the reception unit 201 through each of the potential measurement electrodes R1, R2, R3 and R4. For example, "entrant electrode placement" performed in electrical exploration may be applied to the potential measurement electrodes R1, R2, R3 and R4, as shown in FIG. 9, and a chargeability M of submarine resources may be calculated using the "dipole-dipole method" as represented by the following equation (4).

[Equation 4]

$$M = \frac{1}{V_R(t_4 - t_3)} \int_{t_3}^{t_4} V_S(t) dt \quad (4)$$

Here, a potential Vs(t) is a potential difference between the potential measurement electrodes P1 and P2 and is a secondary residual potential after interruption of the current $I_1$.

In addition, the submarine resource exploration system 1 may include an environment sensor for detecting a submarine environment (environment surrounding the moving body 500) which is not shown. Environments detected by the environment sensor include the electric conductivity, temperature, depth of water (altitude), pH, $CO_2$ and the like of the seawater, for example. The environment sensor may detect one piece of information or a plurality of pieces of information among the electric conductivity, temperature, depth of water (altitude), pH, $CO_2$ and the like of the seawater. The environment sensor continuously detects underwater environments to detect environments at a plurality of positions in water. A conventional environment sensor (e.g., a conductivity temperature depth profiler (CTD)) may be used as the environment sensor, and the environment sensor may be disposed in the moving body 500 like the conventional environment sensor. The environment sensor associates environment information representing a detected environment with a time at which the environment has been detected, a position at which the environment has been detected, and a potential measured by the reception unit 201 at the position.

Further, the submarine resource exploration system 1 may include a moving body sensor for detecting a state of the moving body 500, which is not shown. For example, the state of the moving body 500 detected by the moving body sensor may be shaking of the moving body (specifically, a pitch angle, a roll angle, an orientation and the like). The moving body sensor may detect one piece of information or a plurality of pieces of information among a pitch angle, a roll angle and an orientation. The moving body sensor continuously detects states of the moving body 500 to detect states of the moving body 500 at a plurality of positions in water. A conventional moving body sensor may be used as the moving body sensor, and the moving body sensor may be disposed in the moving body 500 like the conventional moving body sensor. The moving body sensor associates moving body information representing a detected state of the moving body 500 with a time at which the state has been detected, a position at which the state has been detected, and a potential measured by the reception unit 201 at the position.

Measurement performed by the reception unit 201, detection performed by the environment sensor and detection performed by the moving body sensor may be used for correction in calculation of a resistivity ρ and a chargeability M, submarine resource exploration and the like. Further, it is desirable that positioning is performed by a positioning device 40 only in a submarine resource exploration step.

Meanwhile, the signal processing device 30 according to the first embodiment of the present invention is included in the vessel 400 in the above description. However, the place in which the signal processing device 30 according to the first embodiment of the present invention is included is not limited to the vessel 400. The signal processing device 30 according to the first embodiment of the present invention may be present in any place within a range in which information necessary for processing performed by the signal processing unit 301 can be appropriately acquired.

Further, a case in which the two transmission electrodes T1 and T2 are provided in the first embodiment of the present invention has been described as an example. However, the number of transmission electrodes T1 and T2 is not limited to two. In the first embodiment of the present invention, any number of electrodes may be provided as transmission electrodes within a range in which appropriate processing is performed.

In addition, a case in which the four potential measurement electrodes R1, R2, R3 and R4 are provided in the first embodiment of the present invention has been described as an example. However, the number of potential measurement electrodes R1, R2, R3 and R4 is not limited to four. In the first embodiment of the present invention, any number of electrodes may be provided as potential measurement electrodes within a range in which appropriate processing is performed.

The submarine resource exploration system 1 according to the first embodiment of the present invention has been described above. The submarine resource exploration system 1 includes the transmission device 10, the reception device 20 and the signal processing device 30. The transmission device 10 includes the transmission unit 101 which transmits predetermined transmission artificial signals transmitted in order to perform submarine resource exploration in water using water as a medium. The reception device 20 includes the reception unit 201 which receives a composite signal of a signal propagated to the reception device 20 using water as a medium among the transmission artificial signals and a self-potential propagated to the reception device 20 using water as a medium due to a potential anomaly generated due to submarine resources. The signal processing device 30 includes the signal processing unit 301 which separates the composite signal into a received artificial signal and a self-potential.

Accordingly, the submarine resource exploration system 1 is able to accurately separate a time-series signal observed having a received artificial signal representing a signal generated due to a transmission artificial signal transmitted in order to perform submarine resource exploration and a self-potential due to a potential anomaly generated due to submarine resources, which have been mixed, into a received artificial signal and a self-potential.

As a result, the submarine resource exploration system 1 is able to obtain a received artificial signal which is parameters of a resistivity $\rho$ and a chargeability M according to geophysical exploration through electrical exploration and electromagnetic exploration in addition to a self-potential which is a parameter obtained through a self-potential method used for exploration of submarine resources (ores, gas hydrate and the like). The submarine resource exploration system 1 improves the accuracy of submarine resource exploration by using the resistivity $\rho$ and the chargeability M.

Meanwhile, the seawater has been described as an example of water (medium) through which signals such as the received artificial signal, the self-potential, the composite signal and the transmission artificial signal are propagated in the above-described embodiment of the present invention. However, water which is the medium through which such signals are propagated is not limited to the seawater in embodiments of the present invention. Water which is the medium through which such signals are propagated may be lake water, river water or water containing minerals in addition to the seawater in embodiments of the present invention. Further, water which is the medium through which such signals are propagated may be water in which two or more of a plurality of types of water such as the seawater, lake water, river water and water containing minerals are mixed in embodiments of the present invention.

Meanwhile, processing orders of process flows in embodiments of the present invention may be switched within a range in which appropriate processing is performed.

The storage units 104, 204 and 302 in the present invention may be included in any place within a range in which transmission and reception of appropriate information are performed. In addition, a plurality of storage units may be present for each of the storage units 104, 204 and 302 and may store data in a distributed manner within a range in which transmission and reception of appropriate information are performed.

Further, a case in which the submarine resource exploration system 1 performs electrical exploration of analyzing signal amplitudes of a received artificial signal and a self-potential has been described as an example in the first embodiment of the present invention. However, the submarine resource exploration system 1 according to the first embodiment of the present invention is not limited to electrical exploration. The submarine resource exploration system 1 according to the first embodiment of the present invention may perform electromagnetic exploration. In such a case, it is desirable that the submarine resource exploration system 1 separates a composite signal into a received artificial signal and a self-potential and analyzes the received artificial signal in a frequency domain or a time domain as in a case in which electrical exploration is performed. Specifically, the signal processing unit 301 of the submarine resource exploration system 1 acquires information represented by the data table TBL1 stored in the storage unit 104 from the transmission device 10. In addition, the signal processing unit 301 acquires information represented by the data table TBL2 stored in the storage unit 204 from the reception device 20. It is desirable that the submarine resource exploration system 1 performs streamer type observation as performed in non-Patent Literature, A. McKay et al., "Towed Streamer EM-reliable recovery of sub-surface resistivity," first break volume 33, April 2015, pp. 75-85, along with transmission and reception in the deep sea in proximity to an object by analyzing acquired data having time set by the first atomic clock 105 and the second atomic clock 206 through a control source electromagnetic method (CSEM method).

Second Embodiment

Figure 11:
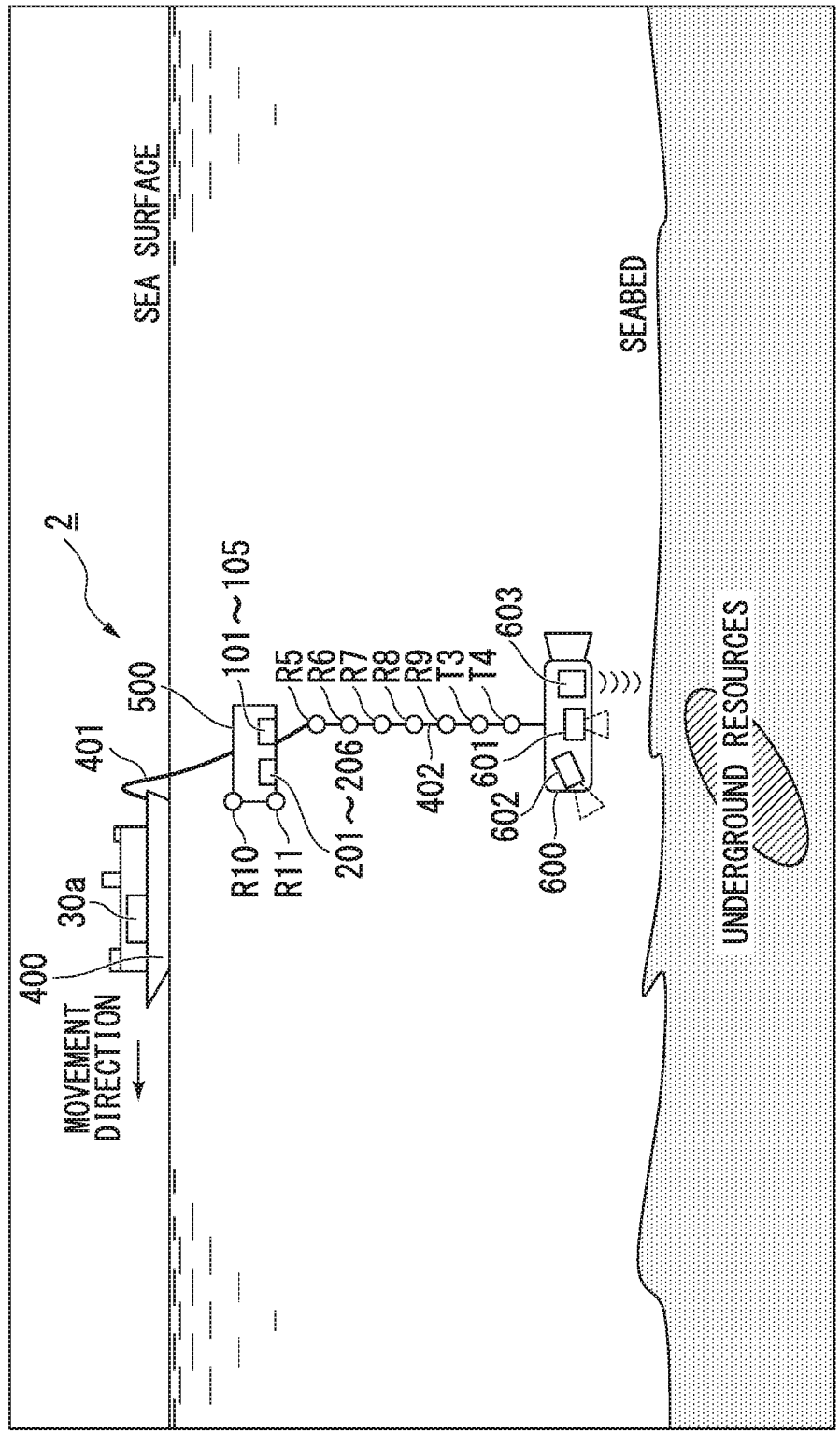
FIG. 11 is a diagram representing a submarine resource exploration system according to a second embodiment of the present invention.

FIG. 11 is a diagram representing a submarine resource exploration system 1a according to a second embodiment of the present invention. The submarine resource exploration system 1a of the second embodiment is the same as the submarine resource exploration system 1 of the first embodiment in that electrical exploration and self-potential exploration for underground resources are simultaneously performed but differs from the submarine resource exploration system 1 of the first embodiment with respect to a positional relationship between transmission electrodes for transmitting transmission artificial signals and potential measurement electrodes for receiving a composite signal of a received artificial signal and a self-potential. Specifically, a plurality of transmission electrodes and potential measurement electrodes are positioned in an approximately horizontal direction in the submarine resource exploration system 1, whereas a plurality of transmission electrodes and potential measurement electrodes are positioned in an approximately vertical direction in the submarine resource exploration system 1*a*.

FIG. 11 shows an example in which transmission electrodes T3 and T4 and potential measurement electrodes R5 to R9 are attached to a cable 402 which connects the moving body 500 and a second moving body 600. Meanwhile, the plurality of potential measurement electrodes are not necessarily attached to the cable 402 if each thereof is positioned in an approximately vertical direction with respect to other potential measurement electrodes. FIG. 11 shows an example in which potential measurement electrodes R10 and R11 are also attached to the moving body 500 in addition to the potential measurement electrodes R5 to R9 attached to the cable 402.

Further, the moving body 600 serves as a weight for maintaining the cable 402 in an approximately vertical direction in FIG. 11. In this case, it is possible to approximate the row of the potential measurement electrodes R5 to R9 to the vertical direction by sufficiently reducing a towing speed. In addition, in this case, apparatuses such as a main camera 601, a front monitoring camera 602 and an environment sensor 603 are included in the moving body 600, for example. The main camera 601 photographs the seafloor and the front monitoring camera 602 photographs the front of a movement direction of the moving body 600. The environment sensor 603 is a sensor for measuring the depth of water of an observation point. For example, the environment sensor 603 may include a CTD and an altimeter. In this case, the environment sensor 603 measures the depth of water of an observation point using the sum of the depth of the moving body 600 measured by the CTD and the altitude from the seafloor to the moving body 600 measured by the altimeter. Subsea images photographed by various cameras and measurement information of the environment sensor 603 are transmitted to control systems of the vessel 400, the moving body 500 and the like and used for adjustment of the speed and depth of the moving body 600.

In addition, the submarine resource exploration system 1*a* differs from the submarine resource exploration system 1 of the first embodiment in that the former includes a transmission device 10*a* instead of the transmission device 10, a reception device 20*a* instead of the reception device 20 and a signal processing device 30*a* instead of the signal processing device 30.

Figure 12:
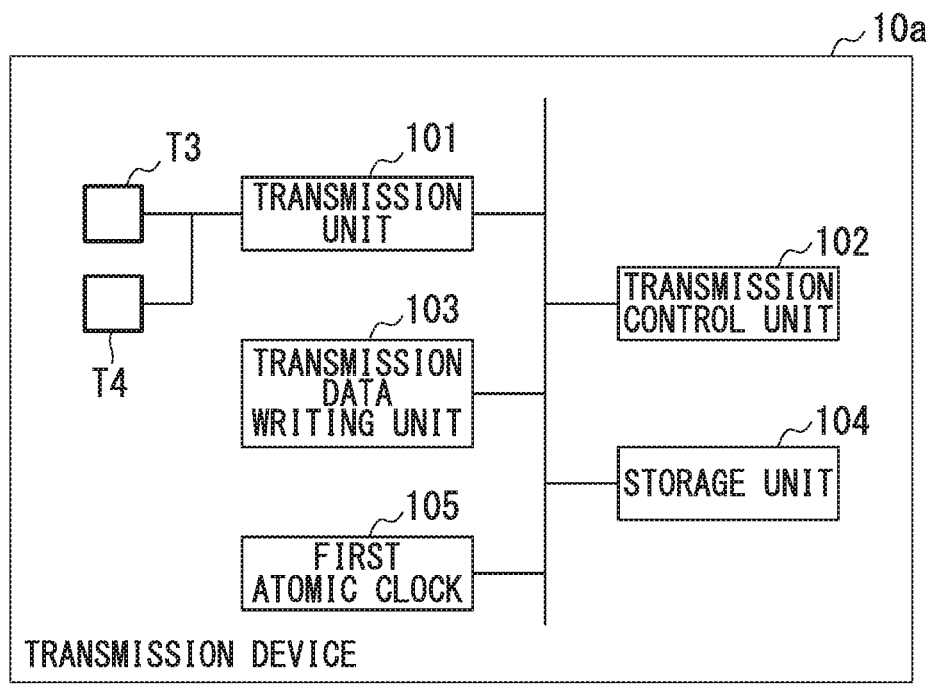
FIG. 12 is a diagram representing a configuration of a transmission device according to the second embodiment of the present invention.

FIG. 12 is a diagram representing a configuration of the transmission device 10*a* according to the second embodiment of the present invention. Specifically, the transmission device 10*a* differs from the transmission device 10 of the first embodiment in that the former includes the transmission electrodes T3 and T4 instead of the transmission electrodes T1 and T2 but basically has the same configuration as the transmission device 10 of the first embodiment. Accordingly, the same components as those in the first embodiment in FIG. 12 are denoted by the same reference signs as those in FIG. 2 and description thereof is omitted. The transmission electrodes T3 and T4 transmit a transmission artificial signal for electrical exploration like the transmission electrodes T1 and T2 in the first embodiment.

Figure 13:
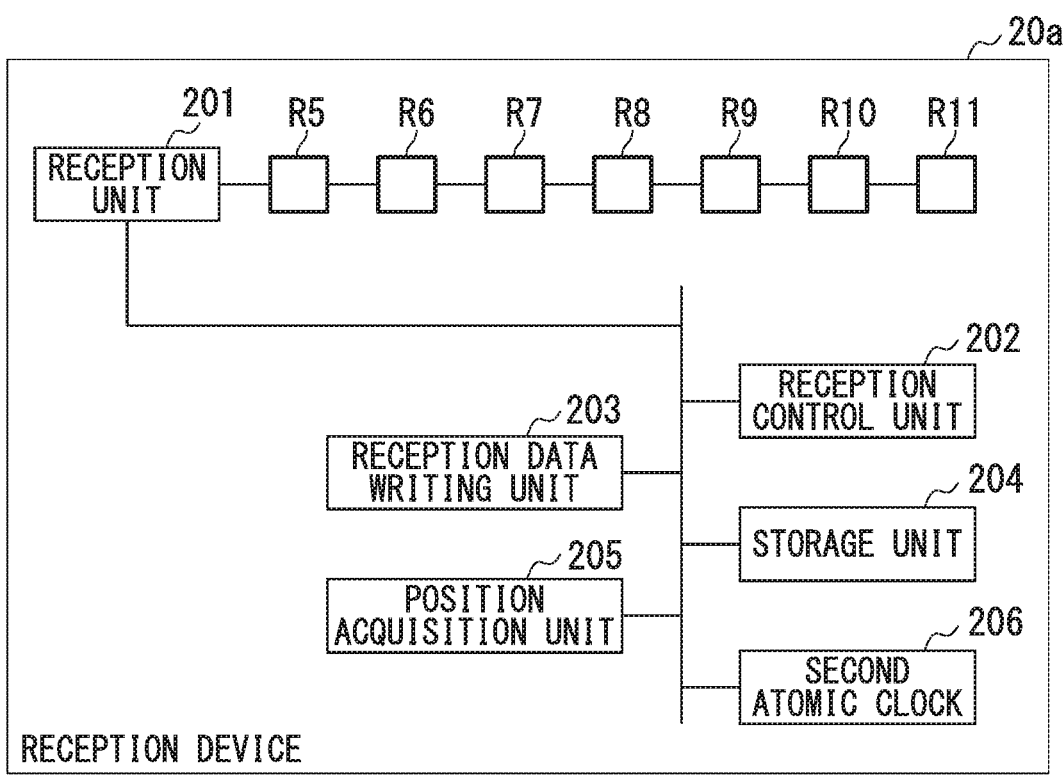
FIG. 13 is a diagram representing a configuration of a reception device according to the second embodiment of the present invention.

FIG. 13 is a diagram representing a configuration of the reception device 20*a* according to the second embodiment of the present invention. Specifically, the reception device 20*a* differs from the reception device 20 of the first embodiment in that the former includes the potential measurement electrodes R5 to R11 instead of the potential measurement electrodes R1 to R4 but basically has the same configuration as the reception device 20 of the first embodiment. Accordingly, the same components as those in the first embodiment in FIG. 13 are denoted by the same reference signs as those in FIG. 4 and description thereof is omitted. Further, the number of potential measurement electrodes included in the reception device 20*a* is desirably plural and may be a number different from that in the figure. The potential measurement electrodes R5 to R11 receive a composite signal of a self-potential and a received artificial signal based on transmission artificial signals transmitted from the transmission electrodes T3 and T4 like the potential measurement electrodes R1 to R4 in the first embodiment.

Figure 14:
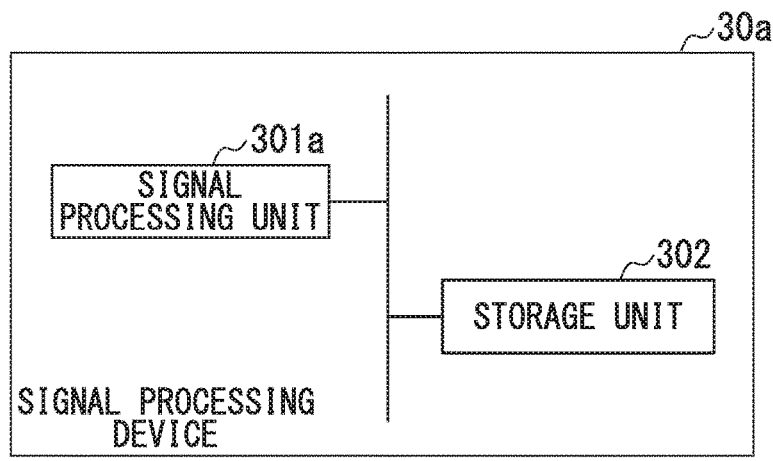
FIG. 14 is a diagram representing a configuration of a signal processing device according to the second embodiment of the present invention.

FIG. 14 is a diagram representing a configuration of the signal processing device 30*a* according to the second embodiment of the present invention. Specifically, the signal processing device 30*a* differs from the signal processing device 30 of the first embodiment in that the former includes a signal processing unit 301*a* instead of the signal processing unit 301 but basically has the same configuration as the signal processing device 30 of the first embodiment. Accordingly, the same components as those in the first embodiment in FIG. 14 are denoted by the same reference signs as those in FIG. 5 and description thereof is omitted.

The signal processing unit 301*a* acquires information represented by the data table TBL2 from the reception device 20*a* as in the first embodiment. The signal processing unit 301*a* moves the acquired information to the storage unit 302 thereof. The signal processing unit 301*a* identifies a composite signal as in the first embodiment on the basis of the information represented by the data table TBL2 stored in the storage unit 302. The signal processing unit 301*a* separates the identified composite signal into a received artificial signal and a self-potential.

Meanwhile, the waveform of a self-potential measured in the second embodiment is observed as a different waveform from the first embodiment due to a different placement of the potential measurement electrodes. Hereinafter, a difference between waveforms obtained with respect to a self-potential will be described.

Figure 15:
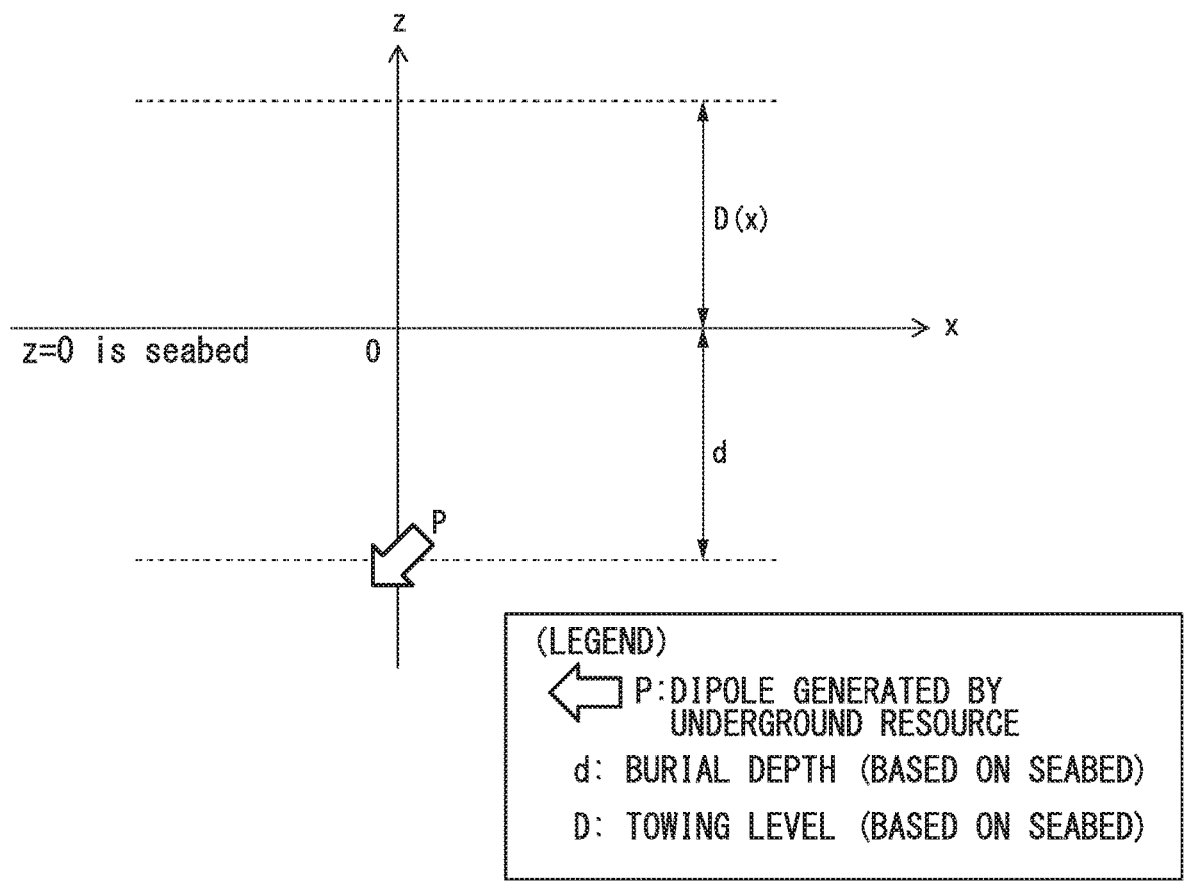
FIG. 15 is a diagram describing a method of analyzing a potential/electric field anomaly in seawater caused by a dipole in the second embodiment of the present invention.

FIG. 15 is a diagram describing a method of analyzing a potential/electric field anomaly in the seawater generated due to a current dipole under the seafloor. According to the reference literature below, an anomaly of potential in the surroundings of underground resources under oxygen reduction gradient can be represented by a downward dipole. Here, a potential/electric field in the seawater generated according to a dipole can be analytically represented in a simple case in which the seafloor is flat. Meanwhile, the discussion below is approximately established even in a case in which the above premise is not provided.

Reference literature: Sato, M. and Mooney, H. M., The electrochemical mechanism of sulfide self-potentials, Geophysics, 25(1): 226-249, 1960.

For example, when the moving body 500 is assumed to navigate right above a dipole and a subsea area is modeled as shown FIG. 15, potential/electric field E ($E_x$, $E_y$, $E_z$) generated due to a vertical direction component $P_z$ of a dipole P may be represented by the following equations (5) to (10). Meanwhile, the x-axis direction represents a navigation direction of the moving body 500 in FIG. 15. d denotes a depth at which the dipole is generated, that is, the depth of underground resources existing in the seafloor, and D(x) denotes a towing level of the moving body 500. Here, D(x) is a function of an observation point x in consideration of the fact that the towing level of the moving body 500 is different according to states of the seabed. In addition, $\sigma_+$ represents an electric conductivity of an area above the seafloor (seawater) and $\sigma_-$ represents an electric conductivity of an area below the seafloor (sediment). Further, $P_z$ in equations denotes a dipole moment and is represented by an absolute value in the equations because $P_z < 0$ for a downward dipole.

[Equation 5]
$$z = D(x) \quad (5)$$

[Equation 6]
$$\phi_+ = -\frac{(1-\lambda)|P_z|}{4\pi\sigma_-} \frac{z+|d|}{\{x^2+(z+|d|)^2\}^{3/2}} \quad (6)$$

[Equation 7]
$$E_x = -\frac{\partial \phi_+}{\partial x} = -\frac{(1-\lambda)|P_z|}{4\pi\sigma_-} \frac{3x(z+|d|)}{\{x^2+(z+|d|)^2\}^{5/2}} \quad (7)$$

[Equation 8]
$$E_y = -\frac{\partial \phi_+}{\partial y} = 0 \quad (8)$$

[Equation 9]
$$E_z = -\frac{\partial \phi_+}{\partial z} = -\frac{(1-\lambda)|P_z|}{4\pi\sigma_-} \frac{2(z+|d|)^2 - x^2}{\{x^2+(z+|d|)^2\}^{5/2}} \quad (9)$$

[Equation 10]
$$\lambda = \frac{\sigma_+ - \sigma_-}{\sigma_+ + \sigma_-} \quad (10)$$

Figure 16:
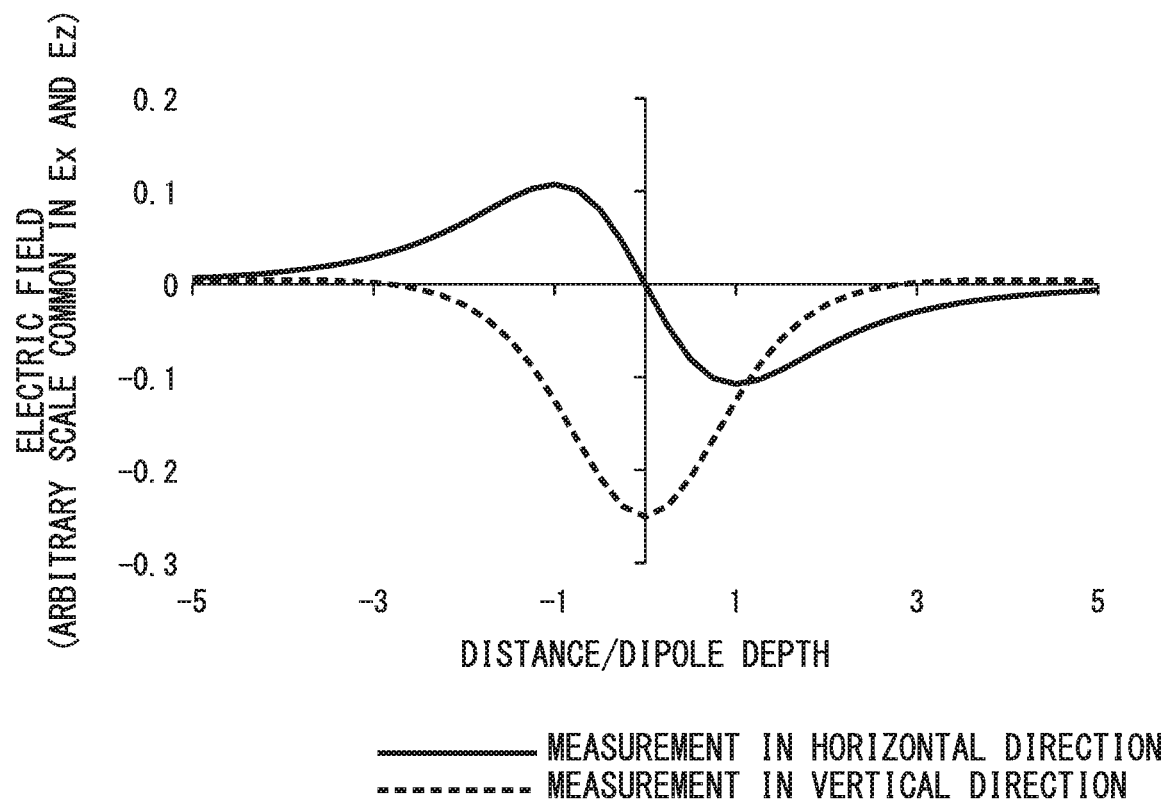
FIG. 16 is a diagram representing a specific example of a result of analysis of electric fields near the seafloor in which underground resources are buried, performed by the signal processing device according to the second embodiment of the present invention.

FIG. 16 is a diagram representing a specific example of a result of analysis of electric fields near the seafloor in which underground resources are buried, performed by the signal processing device 30a according to the second embodiment of the present invention. In FIG. 16, the horizontal axis represents a distance from a dipole in the horizontal direction (that is, a distance from a position at which underground resources are buried) and the vertical axis represents electric field. As shown in FIG. 16, an electric field measured with potential measurement electrodes disposed in the horizontal direction has an inflection point right above a dipole, whereas an electric field measured with potential measurement electrodes disposed in the vertical direction reaches an extreme value right above the dipole. Accordingly, it is desirable to detect a peak of an acquired self-potential in estimation of a position at which underground resources are buried and it is possible to easily identify a position at which underground resources are buried in an intuitive manner and a signal processing manner. Further, in the measurement of the electric field in the vertical direction as shown in FIG. 16, a signal having a larger amplitude than that in the horizontal direction is acquired. This is advantageous for self-potential exploration.

According to the exploration method of the second embodiment, it is possible to simultaneously perform both of electrical exploration and self-potential exploration as in the first embodiment and to acquire more effective measurement data with respect to self-potential exploration.

MODIFIED EXAMPLES

Figure 17:
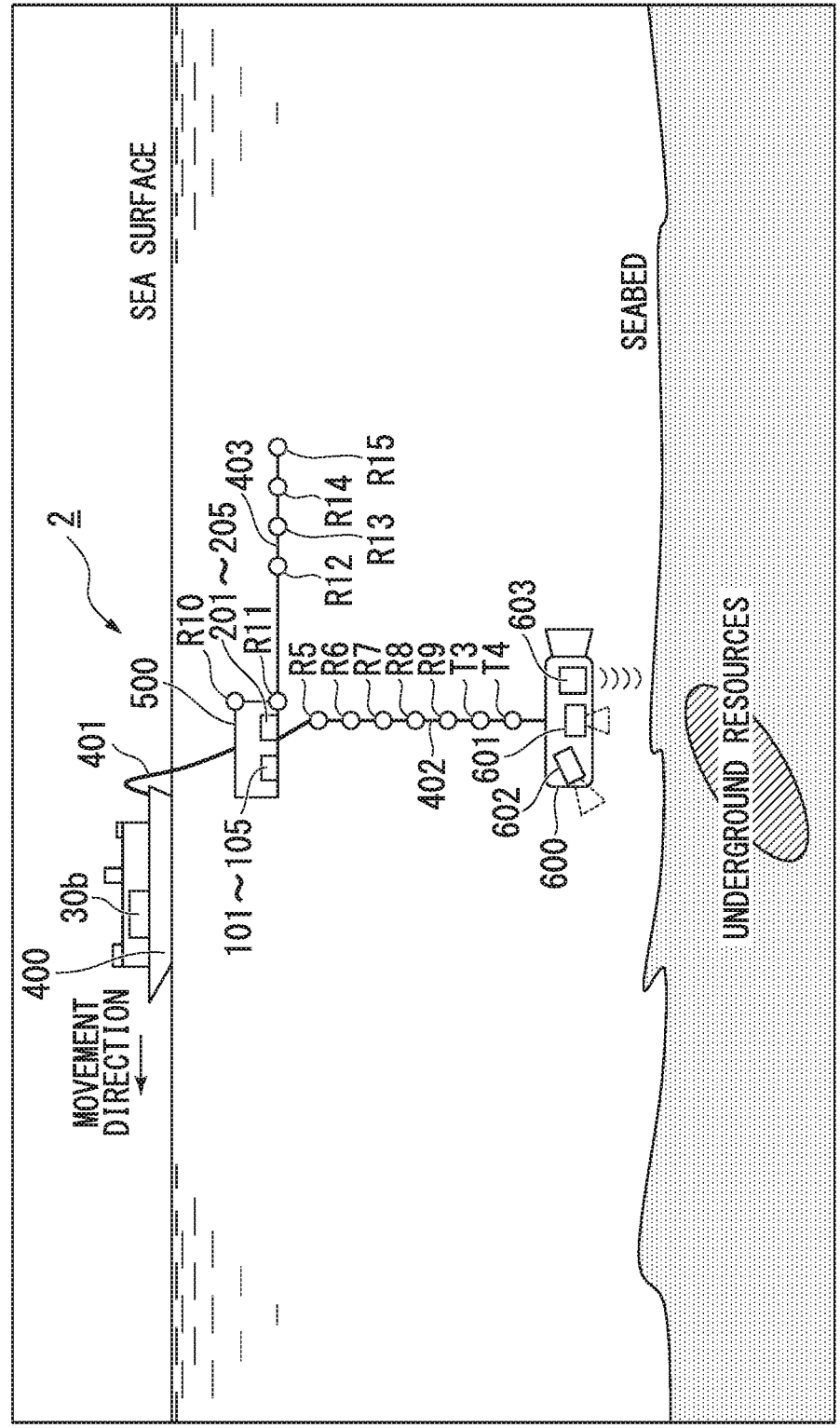
FIG. 17 is a diagram representing a modified example of the submarine resource exploration system according to the second embodiment of the present invention.
Figure 18:
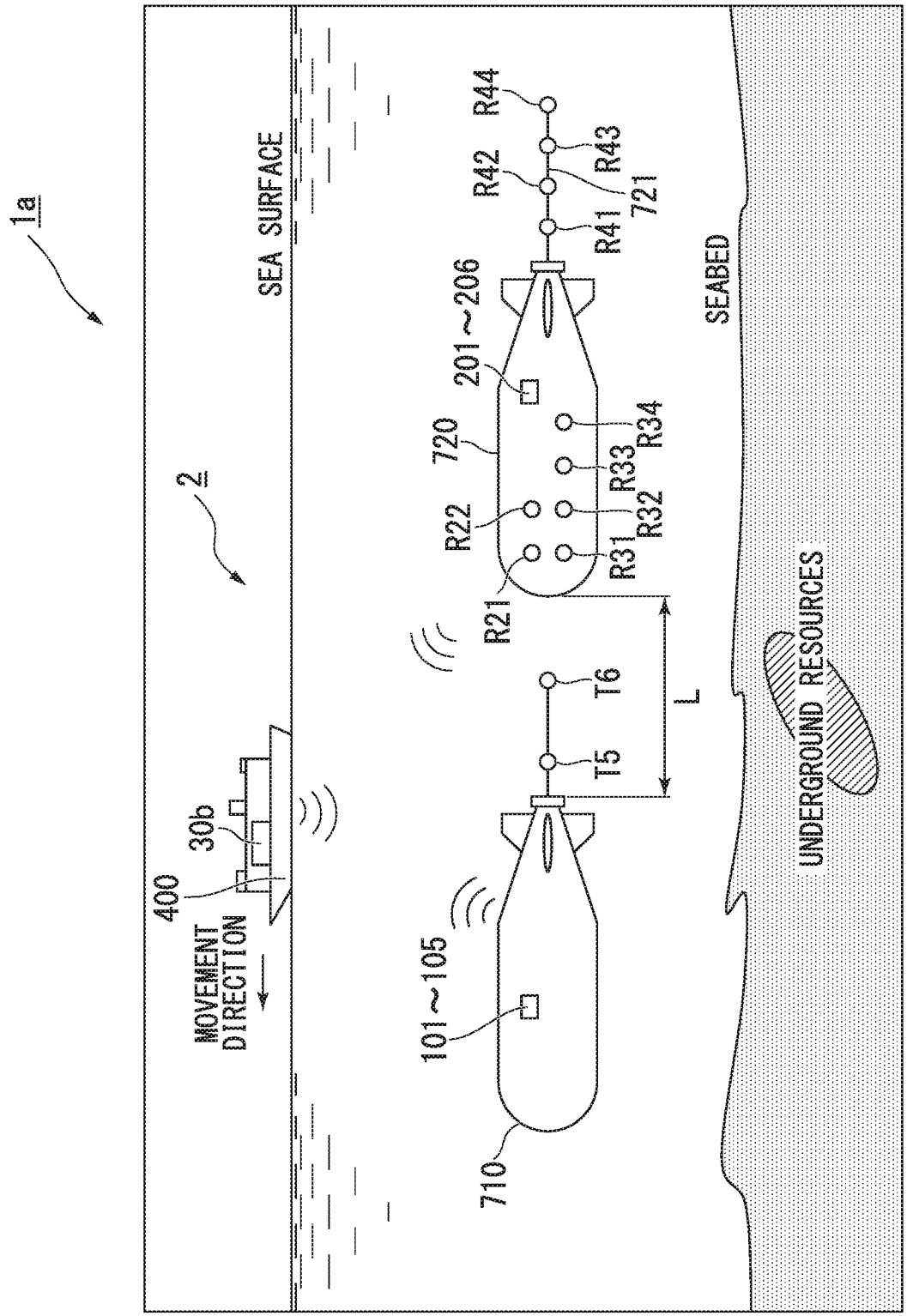
FIG. 18 is a diagram representing a modified example of the submarine resource exploration system according to the second embodiment of the present invention.
Figure 19:
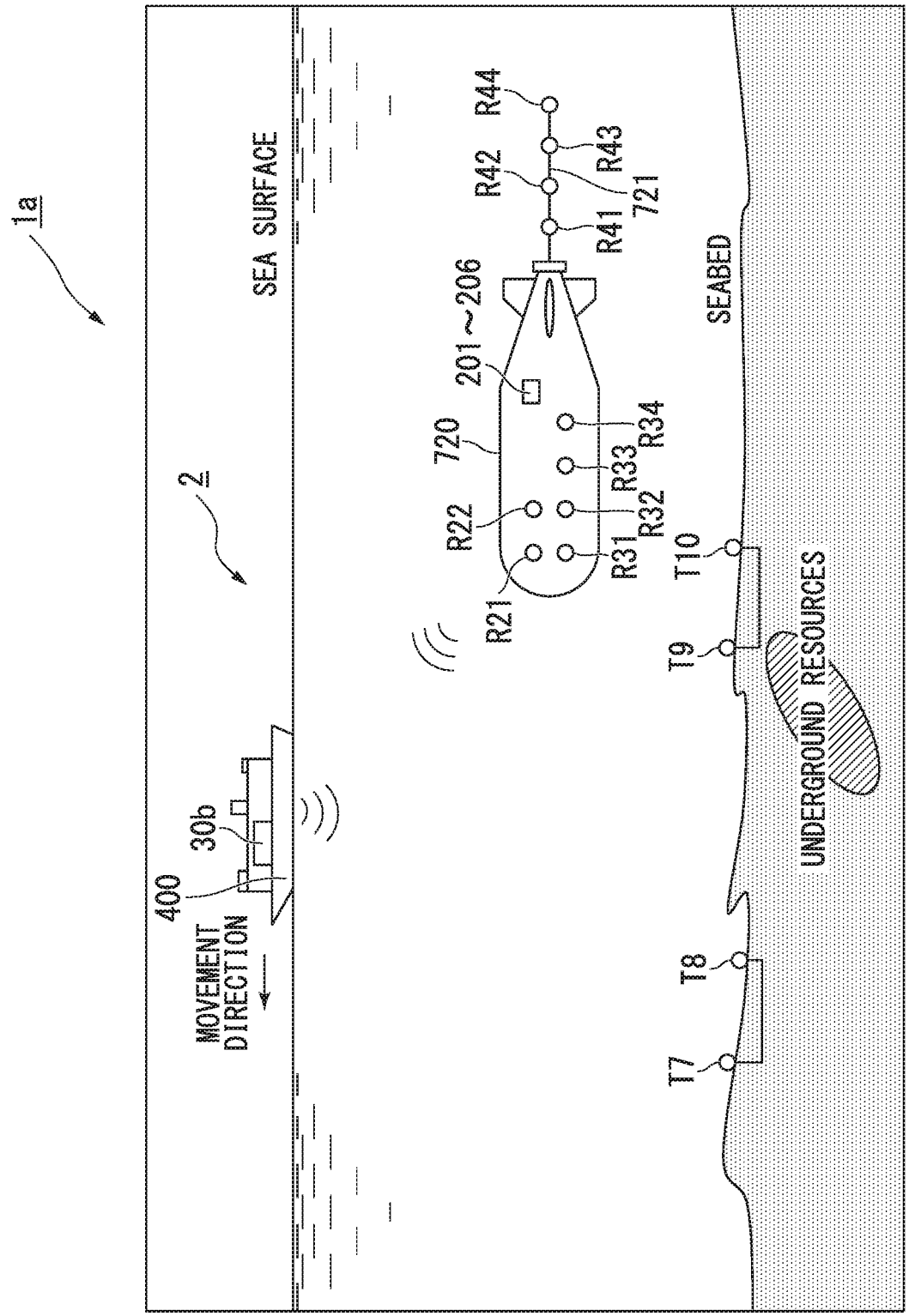
FIG. 19 is a diagram representing a modified example of the submarine resource exploration system according to the second embodiment of the present invention.

Although methods of estimating a position at which underground resources are buried on the basis of a received artificial signal and a self-potential measured using potential measurement electrodes disposed in any of the horizontal direction and the vertical direction have been described in the first embodiment and the second embodiment, estimation of a burial position may be performed on the basis of signals measured using both potential measurement electrodes disposed in the horizontal direction and potential measurement electrodes disposed in the vertical direction, as shown in FIGS. 17 to 19.

FIG. 17 shows an example in which a cable 403 which is pulled in the horizontal direction according to movement of the moving body 500 is attached to the moving body 500 of the submarine resource exploration system 1a in the second embodiment, and potential measurement electrodes R12 to R15 are attached to the attached cable 403. In this case, the potential measurement electrodes R12 to R15 receive composite signals at the same depth while moving in the horizontal direction according to movement of the moving body 500.

FIG. 18 shows an example in which a transmission device 10a is mounted in an autonomous underwater vehicle (AUV) 710 which can autonomously move in the sea, instead of the moving body 500 or 600 towed by the vessel 400 and a reception device 20a is mounted in an identical AUV 720. The AUV 710 and the AUV 720 navigate while maintaining a fixed distance L therebetween. Further, the distance between the AUV 710 and the AUV 720 may be autonomously controlled by the AUV 710 and the AUV 720 by transmitting and receiving position information and the like therebetween or may be controlled by other systems or devices such as the control system of the vessel 400. In such a navigation state, the transmission device 10a transmits a transmission artificial signal for electrical exploration and the reception device 20a receives a composite signal based on the transmitted transmission artificial signal. Meanwhile, configurations of the transmission device 10a and the reception device 20a included in an AUV 700 are the same as the second embodiment except that the number of various electrodes is different.

In this case, transmission electrodes T5 and T6 for transmitting a transmission artificial signal are attached to the AUV 710, potential measurement electrodes R21, R22 and R31 to R34 are attached to the side of the hull of the AUV 720, and the potential measurement electrodes R41 to R44 are attached to a cable 721 for towing the AUV 720, for example. In this case, potentials in the vertical direction may be measured using a combination of the potential measurement electrodes R21 and R31 and a combination of the potential measurement electrodes R22 and R32. In addition, potentials in the horizontal direction may be measured using a combination of the potential measurement electrodes R21 and R22, a combination of the potential measurement electrodes R31 to R34 and a combination of the potential measurement electrodes R41 to R44. Meanwhile, the transmission electrodes are not necessarily attached to a moving body such as the AUV 710 and may be installed in advance at a predetermined position on a navigation route of the AUV 720, as shown in FIG. 19. For example, T7 and T8, and T9 and T10 may be installed as transmission electrode pairs, as shown in the figure.

In the cases of the examples of FIGS. 17 to 19, a signal processing device 30b is configured as a device having both the function of the signal processing device 30 of the first embodiment and the function of the signal processing device 30a of the second embodiment. The submarine resource exploration system 1a of modified examples configured as described above is able to simultaneously perform electrical exploration and self-potential exploration and to simultaneously perform measurements in the vertical direction and the horizontal direction with respect to self-potentials. Further, when potentials in the horizontal direction are measured at different depths, exploration in the horizontal direction may be performed for each potential of the same depth or may be performed after conversion of potentials at different depths into potentials at the same depth according to electromagnetic correction.

Although embodiments of the present invention have been described, each of the above-described transmission device 10 (or 10a), the reception device 20 (or 20a) and the signal processing device 30 (or 30a or 30b) may have a computer system. In addition, the above-described processes are stored in the form of a program in a computer readable recording medium, and the program is read and executed by a computer to perform the aforementioned processing. Here, the computer readable recording medium refers to a magnetic disk, a magneto-optic disk, a CD-ROM, a DVD-ROM, a semiconductor memory or the like. Further, the computer program may be distributed to computers through a communication line and a computer which has received the distribution may execute the program.

In addition, the aforementioned program may realize some of the above-described functions. Further, the aforementioned program may be a file so-called a differential file (differential program) capable of realizing the above-described functions by combining the functions with a program which has already been recorded in a computer system.

While some embodiments of the present invention have been described, these embodiments are exemplary and do not limit the scope of the invention. Various additions, omissions, substitutions and modifications of these embodiments can be made without departing from the spirit or scope of the invention.

What is claimed is:

1. A submarine resource exploration system comprising a transmission device, a reception device, and a signal processing device, wherein
the transmission device includes a transmission unit which transmits a transmission artificial signal representing a predetermined signal transmitted in order to perform exploration of submarine resources in water using water as a medium,
the reception device includes a reception unit which receives a composite signal of a received artificial signal representing a signal propagated to the reception device using water as a medium in the transmission artificial signal, and a self-potential propagated to the reception device using water as a medium due to a potential anomaly generated due to submarine resources, and
the signal processing device includes a signal processing unit which separates the composite signal into the received artificial signal and the self-potential,
the reception device, or the transmission device and the reception device are installed in a mobile body moving in water,
the reception device includes a plurality of electrodes which receive the composite signal, and the plurality of electrodes are separately disposed in the horizontal direction or in a vertical direction at predetermined intervals, and
the signal processing unit estimates a position corresponding to an inflection point of an electric field, which is indicated by a signal obtained by separating the composite signal, in a horizontal direction or a position corresponding to an extreme point of the electric field in a vertical direction as a position at which underground resources are buried.

2. The submarine resource exploration system according to claim 1, wherein
the transmission device includes a first atomic clock, and a transmission data writing unit which makes a first association information of a current value of the transmission artificial signal associated with a time indicated by the first atomic clock and a position of the transmission device at a time when the transmission device transmits the transmission artificial signal and wherein the transmission device writes the first association information to a first data table of a storage unit at predetermined time intervals,
the reception device includes a second atomic clock synchronized in time with the first atomic clock, and a reception data writing unit which makes a second association information of a voltage value of a composite signal sampled by the reception unit at a predetermined time interval associated with the time indicated by the second atomic clock when the reception unit has sampled the composite signal and a position of the reception device when the reception unit has sampled the composite signal and wherein
the reception device writes the second association information to a second data table of a storage unit, and
the signal processing unit separates the composite signal into the received artificial signal and the self-potential on the basis of the data on the second data table written by the reception data writing unit to the storage unit.

3. The submarine resource exploration system according to claim 1, wherein the signal processing unit separates the composite signal into the received artificial signal and the self-potential using a low pass filter.

4. The submarine resource exploration system according to claim 1, wherein the signal processing unit separates the composite signal into the received artificial signal and the self-potential using polynomial approximation including the first order.

5. The submarine resource exploration system according to claim 1, wherein the signal processing unit separates the composite signal into the received artificial signal and the self-potential on the basis of principal component analysis or independent component analysis.

6. The submarine resource exploration system according to claim 1, wherein the signal processing unit separates the composite signal into the received artificial signal and the self-potential on the basis of the transmission artificial signal, a sine wave signal representing each frequency component included in the transmission artificial signal, and a cosine wave signal having a phase 90° different from the sine wave signal.

7. The submarine resource exploration system according to claim 1, wherein the signal processing unit separates the composite signal into the received artificial signal and the self-potential using a high pass filter.

8. The submarine resource exploration system according to claim 1, wherein the reception device includes a plurality of electrodes which receive the composite signal, and some of the plurality of electrodes are separately disposed in the vertical direction at a predetermined interval and other electrodes are separately disposed in the horizontal direction at a predetermined interval.

9. A signal processing device comprising: a signal processing unit which separates a composite signal of
 a received artificial signal representing a signal propagated to a reception device, comprising a reception unit installed in a mobile body moving in water, using water as a medium in a transmission artificial signal representing a predetermined signal transmitted from a transmission device comprising a transmission unit installed at a predetermined position in water or installed in a mobile body moving in water in order to perform exploration of submarine resources, and
 a self-potential propagated to the reception device using water as a medium due to a potential anomaly generated due to submarine resources into the received artificial signal and the self-potential, wherein
 the reception device includes a plurality of electrodes which receive the composite signal, and the plurality of electrodes are separately disposed in the horizontal direction or in a vertical direction at predetermined intervals, and
 the signal processing unit estimates a position corresponding to an inflection point of an electric field, which is indicated by a signal obtained by separating the composite signal, in a horizontal direction or a position corresponding to an extreme point of the electric field in a vertical direction as a position at which underground resources are buried.

10. A signal processing method comprising:
 transmitting a transmission artificial signal representing a predetermined signal transmitted from a transmission device comprising a transmission unit installed at a predetermined position in water or installed in a mobile body moving in water in order to perform exploration of submarine resources in water using water as a medium;
 receiving a composite signal of a received artificial signal representing a signal propagated to a reception device using water as a medium in the transmission artificial signal, and a self-potential propagated to the reception device using water as a medium due to a potential anomaly generated due to submarine resources, the reception device including a plurality of electrodes which receive the composite signal, and the plurality of electrodes are separately disposed in the horizontal direction or in a vertical direction at predetermined intervals;
 separating the composite signal into the received artificial signal and the self-potential; and
 estimating a position corresponding to an inflection point of an electric field, which is indicated by a signal obtained by separating the composite signal, in a horizontal direction or a position corresponding to an extreme point of the electric field in a vertical direction as a position at which underground resources are buried.

11. An electrical exploration method comprising:
 transmitting a transmission artificial signal representing a predetermined signal transmitted from a transmission device comprising a transmission unit installed at a predetermined position in water or installed in a mobile body moving in water in order to perform exploration of submarine resources in water using water as a medium;
 receiving a composite signal of a received artificial signal representing a signal propagated to a reception device, comprising a reception unit installed in a mobile body moving in water, using water as a medium in the transmission artificial signal, and a self-potential propagated to the reception device using water as a medium due to a potential anomaly generated due to submarine resources; the reception device including a plurality of electrodes which receive the composite signal, and the plurality of electrodes are separately disposed in the horizontal direction or in a vertical direction at predetermined intervals;
 separating the composite signal into the received artificial signal and the self-potential;
 performing exploration using a signal amplitude on the received artificial signal; and
 estimating a position corresponding to an inflection point of an electric field, which is indicated by a signal obtained by separating the composite signal, in a horizontal direction or a position corresponding to an extreme point of the electric field in a vertical direction as a position at which underground resources are buried.

12. An electromagnetic exploration method comprising:
 transmitting a transmission artificial signal representing a predetermined signal transmitted from a transmission device comprising a transmission unit installed at a predetermined position in water or installed in a mobile body moving in water in order to perform exploration of submarine resources in water using water as a medium;
 receiving a composite signal of a received artificial signal representing a signal propagated to a reception device, comprising a reception unit installed in a mobile body moving in water, using water as a medium in the transmission artificial signal, and a self-potential propagated to the reception device using water as a medium due to a potential anomaly generated due to submarine resources, the reception device including a plurality of electrodes which receive the composite signal, and the plurality of electrodes are separately disposed in the horizontal direction or in a vertical direction at predetermined intervals;
 separating the composite signal into the received artificial signal and the self-potential;
 performing exploration in a frequency domain or a time domain on the received artificial signal, and
 estimating a position corresponding to an inflection point of an electric field, which is indicated by a signal obtained by separating the composite signal, in a horizontal direction or a position corresponding to an extreme point of the electric field in a vertical direction as a position at which underground resources are buried.

13. A non-transitory computer readable medium storing a program causing a computer to execute:
 transmitting, by a transmission device, of a transmission artificial signal representing a predetermined signal transmitted from the transmission device comprising a transmission unit installed at a predetermined position in water or installed in a mobile body moving in water in order to perform exploration of submarine resources in water using water as a medium;
 receiving, by a reception device, of a composite signal of a received artificial signal representing a signal propagated to the reception device, comprising a reception unit installed in a mobile body moving in water, using water as a medium in the transmission artificial signal, and a self-potential propagated to the reception device using water as a medium due to a potential anomaly generated due to submarine resources, wherein the reception device includes a plurality of electrodes which receive the composite signal, and the plurality of electrodes are separately disposed in the horizontal direction or in a vertical direction at predetermined intervals;

separating of the composite signal into the received artificial signal and the self-potential; and estimating a position corresponding to an inflection point of an electric field, which is indicated by a signal obtained by separating the composite signal, in a horizontal direction or a position corresponding to an extreme point of the electric field in a vertical direction as a position at which underground resources are buried.

14. A submarine resource exploration system comprising a transmission device, a reception device, and a signal processing device, wherein the transmission device includes
a transmission unit which transmits a transmission artificial signal representing a predetermined signal transmitted in order to perform exploration of submarine resources in water using water as a medium
a first atomic clock, and
a transmission data writing unit which makes a first association information of current value of the transmission artificial signal associated with a time indicated by the first atomic clock and a position of the transmission device at a time when the transmission device transmits the transmission artificial signal and wherein the transmission device writes the first association information to a first data table of a storage unit at predetermined time intervals, the reception device includes
a reception unit which receives a composite signal of a received artificial signal representing a signal propagated to the reception device using water as a medium in the transmission artificial signal, and a self-potential propagated to the reception device using water as a medium due to a potential anomaly generated due to submarine resources,
a second atomic clock synchronized in time with the first atomic clock,
a reception data writing unit which makes a second association information of a voltage value of a composite signal sampled by the reception unit at a predetermined time interval associated with the time indicated by the second atomic clock when the reception unit has sampled the composite signal and a position of the reception device when the reception unit has sampled the composite signal and writes the associated information to a second data table of a storage unit, and
a plurality of electrodes which receive the composite signal, and the plurality of electrodes are separately disposed in the horizontal direction or in a vertical direction at predetermined intervals, and the signal processing device includes a signal processing unit which
separates the composite signal into the received artificial signal and the self-potential on the basis of the data on the second data table written by the reception data writing unit to the storage unit, and
estimates a position corresponding to an inflection point of an electric field, which is indicated by a signal obtained by separating the composite signal, in a horizontal direction or a position corresponding to an extreme point of the electric field in a vertical direction as a position at which underground resources are buried.

* * * * *

UNITED STATES PATENT AND TRADEMARK OFFICE
CERTIFICATE OF CORRECTION

PATENT NO. : 11,099,291 B2  
APPLICATION NO. : 16/312210  
DATED : August 24, 2021  
INVENTOR(S) : Kasaya et al.

Page 1 of 1

It is certified that error appears in the above-identified patent and that said Letters Patent is hereby corrected as shown below:

On the Title Page

In the (73) Assignee Field:
"Japan Agency for Marine-Earth Science and Technology & Nippon Marine Enterprises, Ltd., Yokosuka (JP)"

Should be:
"Japan Agency for Marine-Earth Science and Technology, Yokosuka (JP)
Nippon Marine Enterprises, Ltd., Yokosuka (JP)"

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*